US006963185B2

(12) United States Patent
Takenaka et al.

(10) Patent No.: US 6,963,185 B2
(45) Date of Patent: Nov. 8, 2005

(54) SYSTEM FOR ESTIMATING ATTITUDE OF LEG TYPE MOVING ROBOT ITSELF

(75) Inventors: Toru Takenaka, Wako (JP); Takashi Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/511,128

(22) PCT Filed: Apr. 28, 2003

(86) PCT No.: PCT/JP03/05449

§ 371 (c)(1), (2), (4) Date: Oct. 13, 2004

(87) PCT Pub. No.: WO03/090981

PCT Pub. Date: Jun. 11, 2003

(65) Prior Publication Data

US 2005/0156551 A1 Jul. 21, 2005

(30) Foreign Application Priority Data

Apr. 26, 2002 (JP) ............................ 2002-127066

(51) Int. Cl.$^{7}$ ............................ G05D 1/02; B25J 5/00

(52) U.S. Cl. ............................ 318/568.12; 318/568.11; 901/1; 700/245

(58) Field of Search ...................... 318/568.11, 568.12; 700/245; 901/1, 8

(56) References Cited

U.S. PATENT DOCUMENTS 4,834,200 A * 5/1989 Kajita ........................ 180/8.1
5,151,859 A * 9/1992 Yoshino et al. ............... 701/23
5,159,988 A * 11/1992 Gomi et al. ................. 180/8.6
5,221,883 A * 6/1993 Takenaka et al. ...... 318/568.12
5,355,064 A * 10/1994 Yoshino et al. ........ 318/568.12
5,357,433 A * 10/1994 Takenaka et al. ............. 701/23

(Continued)

FOREIGN PATENT DOCUMENTS

JP 05-305584 11/1993

(Continued)

OTHER PUBLICATIONS

WO 02/40224 A1, Gait Pattern Generating Device for Legged Mobile Robot, Publication Date: May 23, 2002.
WO 03/057425 A1, Gait Producing Device for Leg Type Movable Robot, and Control Device, Publication Date: Jul. 17, 2003.

*Primary Examiner*—Rita Leykin
(74) *Attorney, Agent, or Firm*—Rankin, Hill, Porter & Clark LLP

(57) ABSTRACT

A system for estimating a posture angular velocity of a predetermined part, such as a body 3, of a robot by using motion state amounts of the robot, including a desired motion of a desired gait, a detected value of a joint displacement, and a desired value of a joint displacement of a robot 1 having a gyro sensor (angular velocity sensor) mounted on the body 3 or the like in a case where no slippage is taking place between the robot and a floor, e.g., a state wherein the robot is not in a motion. A drift correction value of the angular velocity sensor is determined on the basis of a difference between the estimated value of the posture angular velocity and a detected posture angular velocity value by the angular velocity sensor, and the detected posture angular velocity value corrected by the drift correction value is integrated to determine an estimated value of the posture angle of the predetermined part.

7 Claims, 14 Drawing Sheets

U.S. PATENT DOCUMENTS

| | | | | | |
|---|---|---|---|---|---|
| 5,404,086 | A | * | 4/1995 | Takenaka et al. | 318/568.12 |
| 5,459,659 | A | * | 10/1995 | Takenaka | 700/260 |
| 5,936,367 | A | * | 8/1999 | Takenaka | 318/568.12 |
| 6,064,167 | A | | 5/2000 | Takenaka et al. | 318/568.12 |
| 6,364,040 | B1 | * | 4/2002 | Klann | 180/8.1 |
| 6,564,888 | B1 | * | 5/2003 | Gomi et al. | 180/8.6 |
| 6,901,313 | B2 | * | 5/2005 | Mori et al. | 700/245 |
| 2004/0056625 | A1 | * | 3/2004 | Sano et al. | 318/568.12 |

FOREIGN PATENT DOCUMENTS

| | | |
|---|---|---|
| JP | 05-318339 | 12/1993 |
| JP | 05-324115 | 12/1993 |
| JP | 09-272083 | 10/1997 |
| JP | 10-086080 | 4/1998 |
| JP | 10-277969 | 10/1998 |
| JP | 2001-138272 | 5/2001 |
| JP | 2002-144260 | 5/2002 |
| JP | 2002-326173 | 11/2002 |

* cited by examiner $$Ka=\begin{pmatrix} Kax & 0 & 0 \\ 0 & Kay & 0 \\ 0 & 0 & 0 \end{pmatrix} \quad Kb=\begin{pmatrix} Kbx & 0 & 0 \\ 0 & Kby & 0 \\ 0 & 0 & 0 \end{pmatrix} \quad G=\begin{pmatrix} 0 \\ 0 \\ g \end{pmatrix}$$

$$Kc=\begin{pmatrix} Kcx & 0 & 0 \\ 0 & Kcy & 0 \\ 0 & 0 & Kcz \end{pmatrix} \quad Kd=\begin{pmatrix} Kdx & 0 & 0 \\ 0 & Kdy & 0 \\ 0 & 0 & Kdz \end{pmatrix}$$

SYSTEM FOR ESTIMATING ATTITUDE OF LEG TYPE MOVING ROBOT ITSELF

TECHNICAL FIELD

The present invention relates to a system for estimating an attitude of a leg type moving robot itself.

BACKGROUND ART

In general, a leg type moving robot, such as a bipedal moving robot, has a clinometer mounted on its body, and the posture of the robot is controlled so that an output of the clinometer (an inclination angle of the body relative to a vertical direction of the body) is converged to an inclination angle of the body of a desired gait.

The clinometer is comprised of a gyro sensor for detecting an angular velocity of the body and an accelerometer (or a vertical indicator, such as a pendulum) for detecting a vertical direction (that is, the gravitational direction). The clinometer is basically adapted to estimate the inclination angle of the body by integrating angular velocities detected by the gyro sensor; however, simply integrating them accumulates integration errors (a so-called "drift" is generated). For this reason, detected values of the accelerometer have been used to correct an estimated inclination angle obtained by integration. To be more specific, a difference between an inclination angle relative to the direction of acceleration detected by the accelerometer and an inclination angle obtained by subjecting a detected value of the gyro sensor to an integrator is determined, and then a correction amount based on the difference (a sum of a value obtained by multiplying the difference by a predetermined gain and a value obtained by integrating the difference and multiplying it by a predetermined gain) is additionally supplied to the integrator so as to correct the inclination angle.

According to this method, however, a drift of the gyro sensor about the vertical axis (the yaw direction) of the robot cannot be compensated for, so that it has been difficult to accurately estimate the orientation of the robot about the vertical axis. In addition, an error of an estimated inclination angle or orientation of the body tends to increase when the body posture of the robot is severely accelerated or decelerated while running or the like.

Hereinafter, an inclination and a direction of a certain representative part, such as a body, will be referred to as "posture" as a generic term. The "inclination" refers to an angle formed relative to a vertical direction. The "direction" refers to a direction of a vector obtained by projecting the vector that indicates the front direction of a representative part onto a horizontal surface.

Generally, a representative part refers to a part provided with a clinometer composed of a gyro sensor and an accelerometer. Other parts may be specified as representative parts if joint displacement detectors, such as encoders, or displacement control actuators are provided on individual joints between the parts and a part with the clinometer, so that the inclinations of the parts can be calculated. For example, even if a head connected by a neck with a joint is provided with a gyro sensor and/or an accelerometer, a body may be defined as a representative part. In an embodiment to be discussed hereinafter, a body will be specified as a representative part.

Furthermore, a set of displacements of all joints is generally referred to as a posture. However, this will not mean a "posture" in the present embodiment unless otherwise specified.

Meanwhile, in a leg type moving robot, reaction forces generated when the robot swings its legs while it is moving cause rotational slippages (spins) to take place between its feet and a floor because the frictional forces between the feet (distal parts of the legs) and the floor exceeds its limit. As a result, the posture of the entire robot rotates about a vertical axis, deviating from the direction of a desired gait.

Complementarily, the body is not necessarily maintained vertically (upright) at all times to generate only the desired gait for straight walking. Even in the desired gait, the entire robot or the body swings or inclines longitudinally or laterally. In other words, the rotation of the entire posture (or the rotation of the posture of a representative part, such as the body) exists also in the desired gait. In the present description, therefore, the rotation of a posture in a desired gait will be referred to as a desired posture rotation. A phenomenon to be mainly discussed in the present description is the deviation of a posture rotation of an entire actual robot (or a posture rotation of a representative part, such as a body) from the above desired posture rotation. Strictly speaking, the phenomenon should be referred to as "perturbation from a desired posture rotation" or "posture rotation perturbation". This, however, will be abbreviated to "posture rotation" hereinafter unless there is a possibility of confusion with a desired posture rotation.

Hereinafter, a phenomenon in which the entire robot posture-rotates about a vertical axis and deviates from a desired gait direction will be referred to, in particular, as a spin.

If the direction of the robot deviates from the desired gait direction by the posture rotation of the robot taking place as described above, then the moving path will also deviate from a desired moving path. In such a case, it is necessary to guide the moving path of the robot to the desired path. For this purpose, the posture, especially the direction, of a representative part, such as the body, of the robot must be accurately estimated. As mentioned above, however, the conventional technique for estimating the posture of the body of the robot has not permitted accurate estimation of the posture of the robot especially in the yaw direction because of influences of the aforesaid drift.

The present invention has been made with a view based on the background explained above, and it is an object thereof to provide a self posture estimating system that enables a leg type moving robot to accurately estimate its own posture, especially its posture in a yaw direction.

DISCLOSURE OF INVENTION

To fulfill the aforesaid object, according to a first invention, there is provided a system for estimating a self posture of a leg type moving robot being controlled to follow a determined desired gait, comprising a posture angular velocity detecting means for detecting a posture angular velocity of a predetermined part of the robot, a slippage-free posture angular velocity estimating means for estimating a posture angular velocity of the predetermined part on the basis of motion state amounts of the robot, including at least one of a desired motion of the desired gait, a detected value of a displacement of a joint of the robot, and a desired value of a displacement of the joint, on the assumption that there is no slippage on a contact surface between the robot and a floor, a drift correction value determining means for determining a drift correction value relative to a detected value of the posture angular velocity detecting means on the basis of at least a detected value of the posture angular velocity detecting means and a posture angular velocity estimated by the slippage-free posture angular velocity estimating means, and an integrating means for integrating at least a posture angular velocity obtained by correcting a detected value of the posture angular velocity detecting means by using the drift correction value, thereby to estimate a posture angle of the predetermined part, wherein the drift correction value determining means determines a new drift correction value so as to bring a difference between a posture angular velocity obtained by correcting a detected value of the posture angular velocity detecting means by using the drift correction value and a posture angular velocity estimated by the slippage-free posture angular velocity estimating means close to zero.

According to the first invention, a posture angular velocity of the predetermined part is estimated on the basis of motion state amounts of the robot, including at least one of a desired motion of the desired gait, a detected value of a joint displacement of the robot, and a desired value of the joint displacement, assuming that there is no slippage on a contact surface between the robot and a floor. More specifically, assuming that there is no slippage as mentioned above makes it possible to estimate a posture angle of the predetermined part by geometric computation on the basis of the motion state amounts, allowing a posture angular velocity of the predetermined part to be estimated as a temporal variation of the posture angle. Further, the drift correction value is determined based at least on the estimated posture angular velocity (an estimated value of posture angular velocity) and a detected value of the posture angular velocity detecting means (a detected value of posture angular velocity). To be more specific, a new drift correction value is determined (the drift correction value is updated) so as to bring a difference between a posture angular velocity obtained by correcting a detected posture angular velocity value by using a drift correction value (already determined drift correction value) and the estimated posture angular velocity value close to zero. To determine a drift correction value, an appropriate feedback control law may be used on the basis of, for example, the above difference so as to determine the drift correction value. Furthermore, the posture angle of the predetermined part is estimated by integrating a posture angular velocity obtained by correcting a detected posture angular velocity value by using at least the determined drift correction value. Thus, according to the first invention, the influences of drift resulting from integration of posture angular velocity can be compensated for, making it possible to accurately estimate the posture angle of the predetermined part as the posture of the robot itself.

In the first invention, preferably, the drift correction value determining means is equipped with a means for determining whether the rotational slippage is taking place on a contact surface between the robot and a floor, and a value of the drift correction value is retained if it is determined that the rotational slippage is taking place (a second invention).

More specifically, according to the first invention, a posture angular velocity estimated on the assumption that there is no slippage on a contact surface between a robot and a floor (referred to as an estimated slippage-free posture angular velocity in the following explanation of the present invention) is used to determine the drift correction value. However, reliability of the estimated slippage-free posture angular velocity deteriorates in a situation wherein rotational slippage is taking place. Hence, according to the second invention, if it is determined that rotational slippage is happening, then the value of a drift correction value is retained (not updated). This makes it possible to secure reliability of the drift correction value and eventually to secure high accuracy of an estimated value of the posture angle of the predetermined part as the posture of the robot itself.

According to a third invention, there is provided a system for estimating a self posture of a leg type moving robot, comprising a posture angular velocity detecting means for detecting a posture angular velocity of a predetermined part of a leg type moving robot, a drift correction value determining means for determining, on the basis of at least a detected value of the posture angular velocity detecting means in a state wherein a motion of the robot is stopped, a drift correction value relative to the detected value, and an integrating means for integrating at least a posture angular velocity obtained by correcting a detected value of the posture angular velocity detecting means by the drift correction value while the robot is in motion so as to estimate a posture angle of the predetermined part.

According to the third invention, a drift correction value is determined on the basis of a detected value of the posture angular velocity detecting means (a detected posture angular velocity value) in a state wherein the motion of the robot is stopped, that is, a detected posture angular velocity value in a state wherein an actual posture angular velocity theoretically becomes zero, thus making it possible to determine a drift correction value with higher reliability. Furthermore, since a posture angular velocity obtained by correcting a detected posture angular velocity value by using at least the drift correction value is integrated while the robot is in motion so as to estimate the posture angle of the predetermined part. Hence, the posture angle of the predetermined part as the posture of the robot itself can be accurately estimated by properly compensating for influences of a drift resulting from the integration of a posture angular velocity.

Preferably, in the first or second invention described above, the drift correction value determining means determines the drift correction value on the basis of a component in a yaw direction of a detected value of the posture angular velocity detecting means and a component in the yaw direction of a posture angular velocity estimated by the slippage-free posture angular velocity estimating means (a fourth invention).

Similarly, in the third invention, the drift correction value determining means preferably determines the drift correction value on the basis of a component in the yaw direction of a detected value of the posture angular velocity detecting means (a fifth invention).

According to the fourth invention and the fifth invention, a drift in the yaw direction of the posture angular velocity detecting means can be properly compensated for, so that the direction of the predetermined part can be particularly estimated with high accuracy, permitting accurate estimation of a moving direction of the robot.

Preferably, in the first through fifth inventions described above, the predetermined part is a body of the robot (a sixth invention). The posture of the body can be accurately estimated, so that control for posture stabilization or the like of the robot can be accurately performed.

BEST MODE FOR CARRYING OUT THE INVENTION

The following will explain a system for estimating a position of a leg type moving robot itself according to an embodiment of the present invention with reference to the accompanying drawings. As the leg type moving robot, a bipedal moving robot will be taken as an example.

Figure 1:
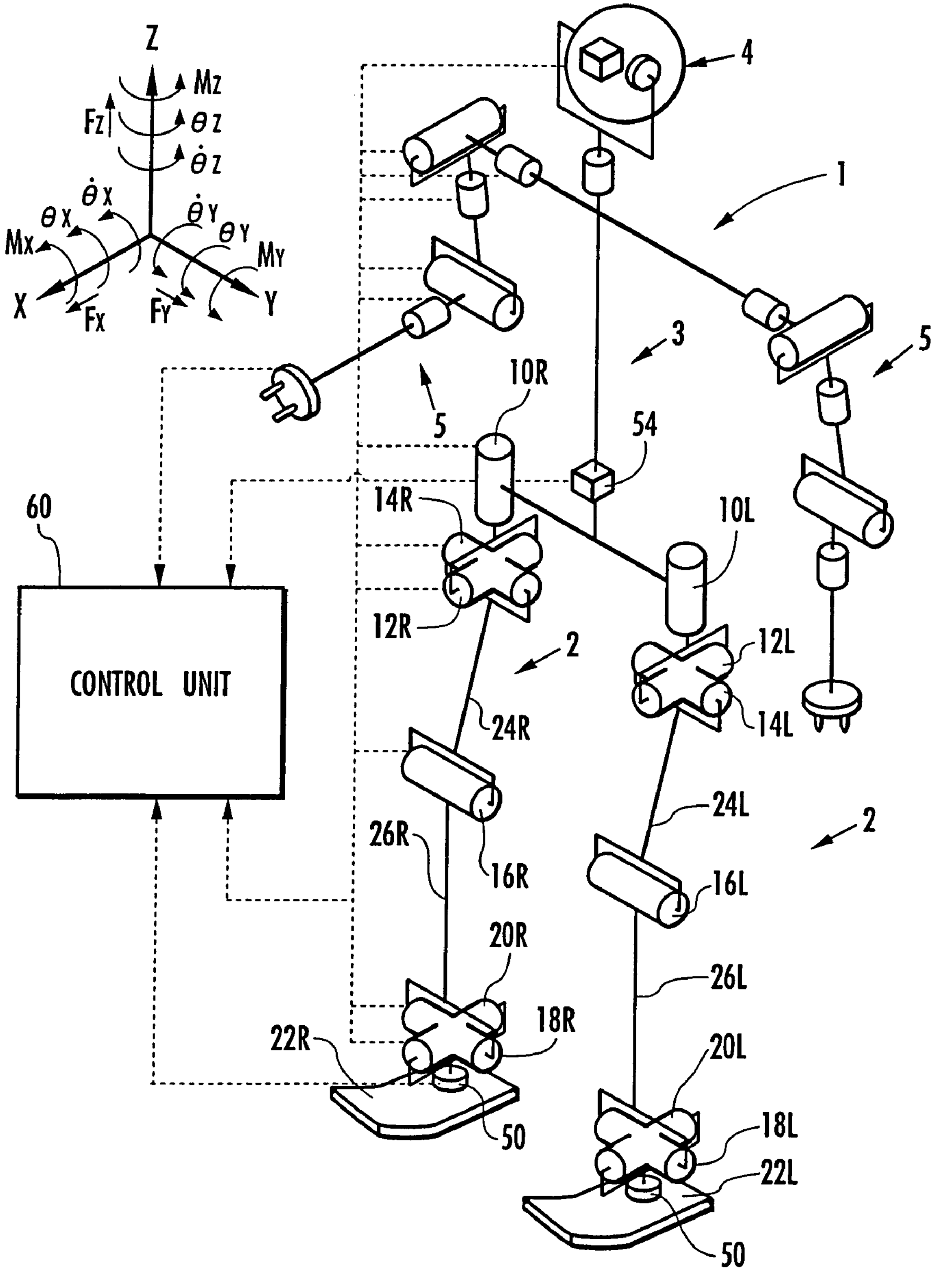
FIG. 1 is a schematic diagram showing an outline of a skeleton of an entire construction of a bipedal moving robot as a leg type moving robot in an embodiment of the present invention.

FIG. 1 is a schematic diagram showing a general view of a bipedal moving robot as the leg type moving robot according to the present embodiment.

As shown in the diagram, a bipedal moving robot (hereinafter referred to as "the robot") 1 is equipped with a pair of right and left legs (leg links) 2, 2 provided such that they extend downward from a body (a base body of the robot 1) 3. Both legs 2, 2 share the same construction, each having six joints. The six joints of each leg are comprised of, in the following order from the body 3 side, joints 10R, 10L (symbols R and L mean correspondence to the right leg and the left leg, respectively; the same will be applied hereinafter) for swinging (rotating) a hip (waist)(for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2. The body 3 is installed at the uppermost top of the two legs 2, 2 through the intermediary of the three joints 10R(L), 12R(L) and 14R(L) of the hip of each leg 2. A control unit 60 or the like, which will be discussed in detail hereinafter, is housed inside the body 3. For convenience of illustration, the control unit 60 is shown outside the body 3 in FIG. 1.

In each leg 2 having the aforesaid construction, a hip joint (or a waist joint) is formed of the joint 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arms 5, 5 are attached to both sides of upper portions of the body 3, and a head 4 is disposed at a top end of the body 3. These arms 5, 5 and the head 4 are not directly connected to a topic of the present invention, so that detailed explanation thereof will be omitted.

According to the construction described above, the foot 22R(L) of each leg 2 is given six degrees of freedom relative to the body 3. During a travel, such as walking, of the robot 1, desired motions of the two feet 22R and 22L can be accomplished by driving 6*2=12 joints of the two legs 2, 2 together ("*" in the present description will denote multiplication as scalar computation, while it will denote an outer product in vector computation) at appropriate angles. This arrangement enables the robot 1 to arbitrarily move in a three-dimensional space.

As shown in FIG. 1, a publicly known six-axis force sensor 50 is provided between the ankle joints 18R(L), 20R(L) and the foot 22R(L) of each leg 2. The six-axis force sensor 50 detects primarily whether the foot 22R(L) of each leg 2 is in contact with a ground, and a floor reaction force (landing load) acting on each leg 2, and it outputs detection signals of three-direction components Fx, Fy, and Fz of a translational force of the floor reaction and three-direction components Mx, My, and Mz of a moment to the control unit 60. Furthermore, the body 3 is equipped with an inclination sensor 54 for mainly detecting an inclination (posture angle) of the body 3 relative to a Z-axis (vertical direction (gravitational direction)) and an angular velocity thereof, and detection signals thereof are supplied from the inclination sensor 54 to the control unit 60. The inclination sensor 54 is provided with a three-axis direction accelerometer and a three-axis direction gyro sensor, which are not shown, and detection signals of these sensors are used to detect an inclination and an angular velocity of the body 3 and also used to estimate a self position/posture of the robot 1. Although detailed structural illustration is omitted, each joint of the robot 1 is provided with an electric motor 64 (refer to FIG. 5) for driving the joint, and an encoder (rotary encoder) 65 (refer to FIG. 5) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 5) is provided at an appropriate position of the robot 1. The joystick 73 is constructed in such a manner that a request regarding a gait of the robot 1, such as a request for turning the robot 1 that is moving straight, is input to the control unit 60 as necessary by operating the joystick 73.

Figure 2:
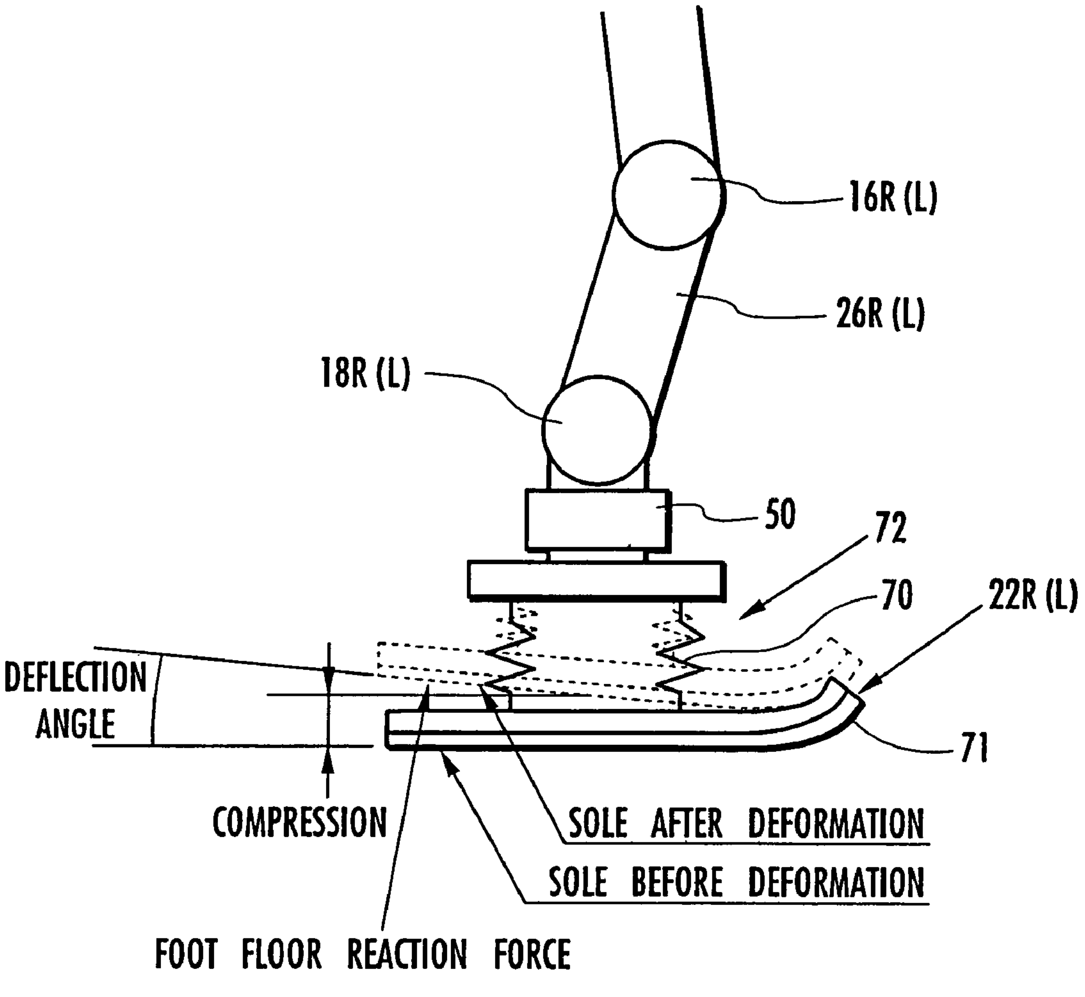
FIG. 2 is a schematic diagram schematically showing a construction of a foot portion of each leg shown in FIG. 1.

FIG. 2 is a diagram schematically showing a basic construction of a distal portion (including each foot 22R(L)) of each leg 2 in the present embodiment. As shown in the diagram, a spring mechanism 70 is installed between each foot 22R(L) and the six-axis force sensor 50, and a foot sole elastic member 71 made of rubber or the like is bonded to a foot sole (the bottom surface of each of the feet 22R and L). These spring mechanism 70 and the foot sole elastic member 71 constitute a compliance mechanism 72. The spring mechanism 70, which will be discussed in detail later, is constructed of a square guide member (omitted in FIG. 2), which is installed on the upper surface of the foot 22R(L), and a piston-shaped member (omitted in FIG. 2) installed adjacently to the ankle joint 18R(L) (the ankle joint 20R(L) being omitted in FIG. 2) and the six-axis force sensor 50, and housed in the guide member through the intermediary of an elastic member (rubber or spring) so that it may be jogged.

The foot 22R(L) indicated by a solid line shown in FIG. 2 is in a state where it is subjected to no floor reaction force. When each leg 2 is subjected to a floor reaction force, the spring mechanism 70 and the sole elastic member 71 of the compliance mechanism 72 flex, causing the foot 22R(L) to shift to the position/posture illustrated by a dashed line in the drawing. The structure of the compliance mechanism 72 is important not only to ease a landing impact but also to enhance controllability, as explained in detail in, for example, Japanese Unexamined Patent Publication Application 5-305584 proposed in the past by the present applicant.

Figure 3:
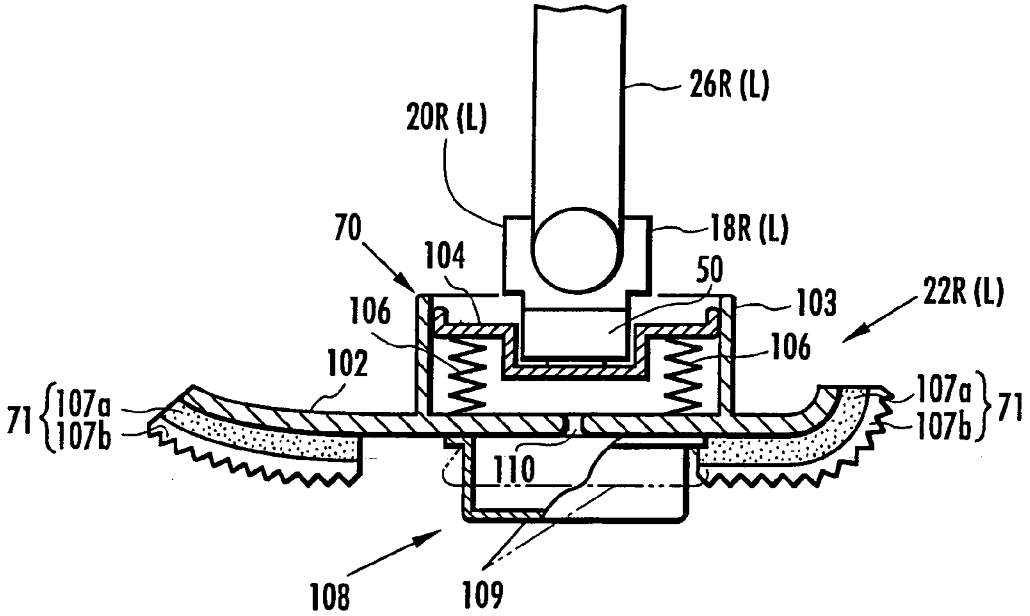
FIG. 3 and FIG. 4 are a sectional diagram viewed sideways and a bottom view, respectively, showing construction details of the foot portion of each leg.
Figure 4:
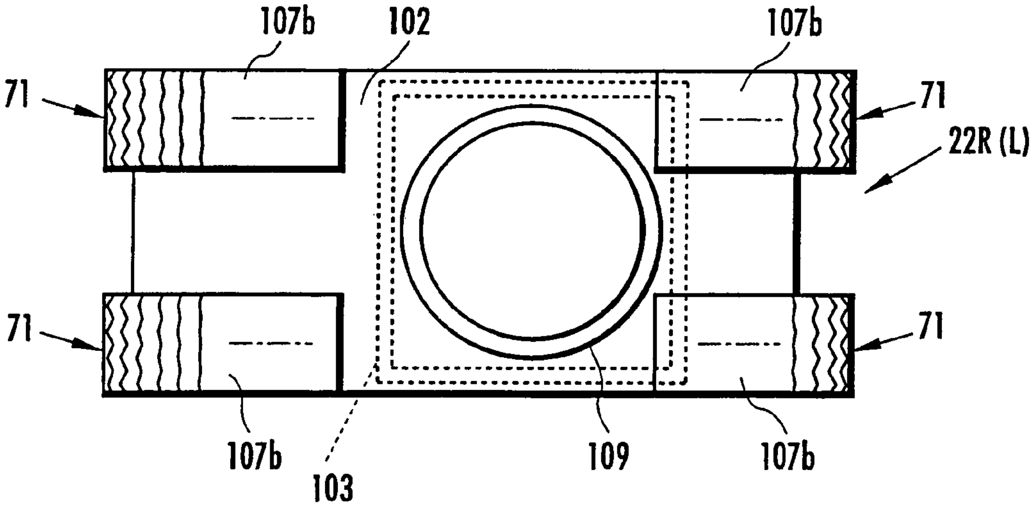

More detailed construction of the foot 22R(L) including the compliance mechanism 72 (hereinafter referred to as the foot mechanism 22R(L) in some cases) will be further explained with reference to FIG. 3 and FIG. 4. FIG. 3 is a sectional view of the foot mechanism 22R(L) observed sideways, and FIG. 4 is a top plan view of the foot mechanism 22R(L) observed from its bottom surface.

The foot mechanism 22R(L) is equipped with a roughly plate-shaped foot plate member 102 as a skeletal member. A front end portion (tiptoe portion) and a rear end portion (heel portion) of the foot plate member 102 are slightly curved upward, the remaining portion being shaped like a flat plate. A guide member 103 having a square cross-sectional shape is fixedly provided on an upper surface of the foot plate member 102 such that an axial center thereof is vertically oriented. Inside the guide member 103, a movable plate (piston-shaped member) 104 is provided along an inner peripheral surface of the guide member 103 such that it is movable in a virtually vertical direction, the movable plate 104 being connected to the ankle joints 18R(L) and 20R(L) through the intermediary of the six-axis force sensor 50.

A rim of the bottom surface of the movable plate 104 is connected to the upper surface of the foot plate member 102 through the intermediary of a plurality of elastic members 106 made of an elastic material, such as a spring or rubber (shown as a spring in the drawing). Hence, the foot plate member 102 is connected to the ankle joint 18R(L) through the intermediary of the elastic member 106, the movable plate 104, and the six-axis force sensor 50. The interior of the guide member 103 (the space under the movable plate 104) is opened to the air through the intermediary of a hole or gap, which is not shown. Atmospheric air freely goes into and out of the guide member 103. The guide member 103, the movable plate 104, and the elastic member 106 constitute the spring mechanism 70 shown in FIG. 2.

A ground contact member 71 serving as the sole elastic member 71 shown in FIG. 2 mentioned above is attached to a bottom surface (lower surface) of the foot plate member 102. The ground contact member 71 is an elastic member (elastic member directly coming in contact with a floor surface) provided between the foot plate member 102 and the floor surface with the foot mechanism 22R(L) in contact with the ground. In the present embodiment, the ground contact member 71 is secured to four corners of the ground contact surface of the foot plate member 102 (both side portions of the tiptoe of the foot plate member 102 and both side portions of the heel).

The ground contact member 71 is formed of two layers, namely, a soft layer 107*a* made of a relatively soft rubber material and a hard layer 107*b* made of a relatively hard rubber material, which are vertically stacked. The hard layer 107*b* is provided on the lowermost surface side as the ground contact surface coming directly in contact with a floor surface when the leg 2 lands.

The foot mechanism 22R(L) is provided with a landing shock absorber 108 in addition to the above components. The landing shock absorber 108 has a bag-shaped member 109 attached to the bottom surface of the foot plate member 102, and a passage 110 for air (atmospheric air), which serves as a compressive fluid, to go into and out of the bag-shaped member 109.

The bag-shaped member 109 surrounded by the ground contact member 71 is provided nearly in a central area of the bottom surface of the foot plate member 102. The bag-shaped member 109 is made of an elastic material, such as rubber, so as to be deformable. The bag-shaped member 109 is shaped like a cylindrical container that is open upward, as indicated by a solid line in FIG. 3, in its natural state wherein it has developed no resilient deformation caused by an external force. The entire peripheral edge of the opening of the bag-shaped member 109 is secured to the bottom surface of the foot plate member 102, and covered by the foot plate member 102. The bag-shaped member 109 is provided such that the bottom portion of the bag-shaped member 109 juts out downward beyond the ground contact member 71 in its natural state wherein it is shaped like the cylindrical container. In other words, the bag-shaped member 109 has a height (a distance from the bottom surface of the foot plate member 102 to the bottom portion of the bag-shaped member 109) that is larger than the thickness of the ground contact member 71. Hence, in a state wherein the foot plate member 102 is in contact with the ground through the intermediary of the ground contact member 71 (the leg 2 being in contact with a floor), the bag-shaped member 109 is compressed in the direction of the height of the bag-shaped member 109 due to a floor reaction force, as indicated by a virtual line in FIG. 3.

In the present embodiment, the natural state wherein the bag-shaped member 109 is shaped like the cylindrical container is a state in which the bag-shaped member 109 is inflated. Since the bag-shaped member 109 is formed of an elastic material, it has a force for restoring its original shape (the cylindrical container shape) when compressed.

The passage 110 provides an inflow/outflow means for air to go into/out of the bag-shaped member 109. In the present embodiment, the passage 110 is formed of a channel hole drilled in the foot plate member 102 to provide communication between the interior of the bag-shaped member 109 and the interior of the guide member 103. In this case, as previously described, the interior of the guide member 103 is opened to the atmosphere, meaning that the passage 110 provides communication for the interior of the bag-shaped member 109 to the atmosphere. Thus, air in the atmosphere is free to go into/out of the bag-shaped member 109 through the intermediary of the passage 110. The bag-shaped member 109 is filled with air when the bag-shaped member 109 is in its inflated state (natural state), the pressure therein being equivalent to atmospheric pressure. The passage 110 is a choke passage so that a fluid resistance is generated when air moves into or out of the bag-shaped member 109.

Figure 5:
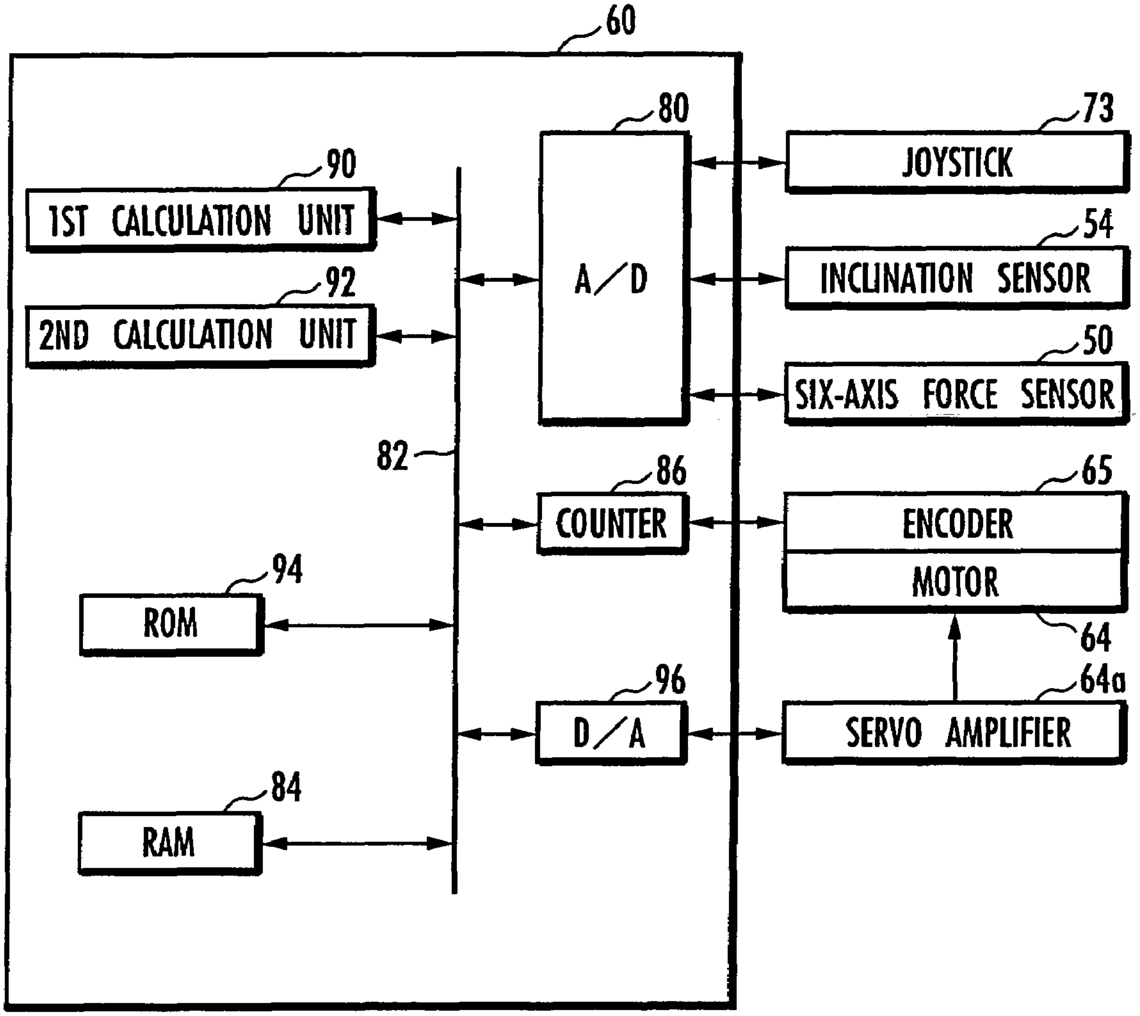
FIG. 5 is a block diagram showing a construction of a control unit provided in the robot shown in FIG. 1.

FIG. 5 is a block diagram showing a construction of the control unit 60. The control unit 60 is comprised of a microcomputer, and includes a first calculation unit 90 and a second calculation unit 92 constructed of CPUs, an A/D converter 80, a counter 86, a D/A converter 96, a RAM 84, a ROM 94, and a bus line 82 for transferring data among them. In the control unit 60, output signals of the six-axis force sensor 50, the inclination sensor 54 (an accelerometer and a rate gyro sensor), the joystick 73, etc. of each leg 2 are converted into digital values by the A/D converter 80 and sent to the RAM 84 via the bus line 82. Outputs of the encoder 65 (rotary encoder) of each joint of the robot 1 are supplied to the RAM 84 via the counter 86.

As will be discussed hereinafter, the first calculation unit 90 generates desired gaits, calculates a joint angle displacement command (a displacement angle of each joint or a command value of a rotational angle of each electric motor 64), and sends the calculation result to the RAM 84. The second calculation unit 92 reads an actual measurement value of a joint angle detected on the basis of an output signal of the encoder 65 and the joint angle displacement command from the RAM 84 to calculate a manipulated variable required for driving each joint, and outputs the calculated variable to the electric motor 64 for driving each joint through the intermediary of the D/A converter 96 and a servo amplifier 64*a*.

Figure 6:
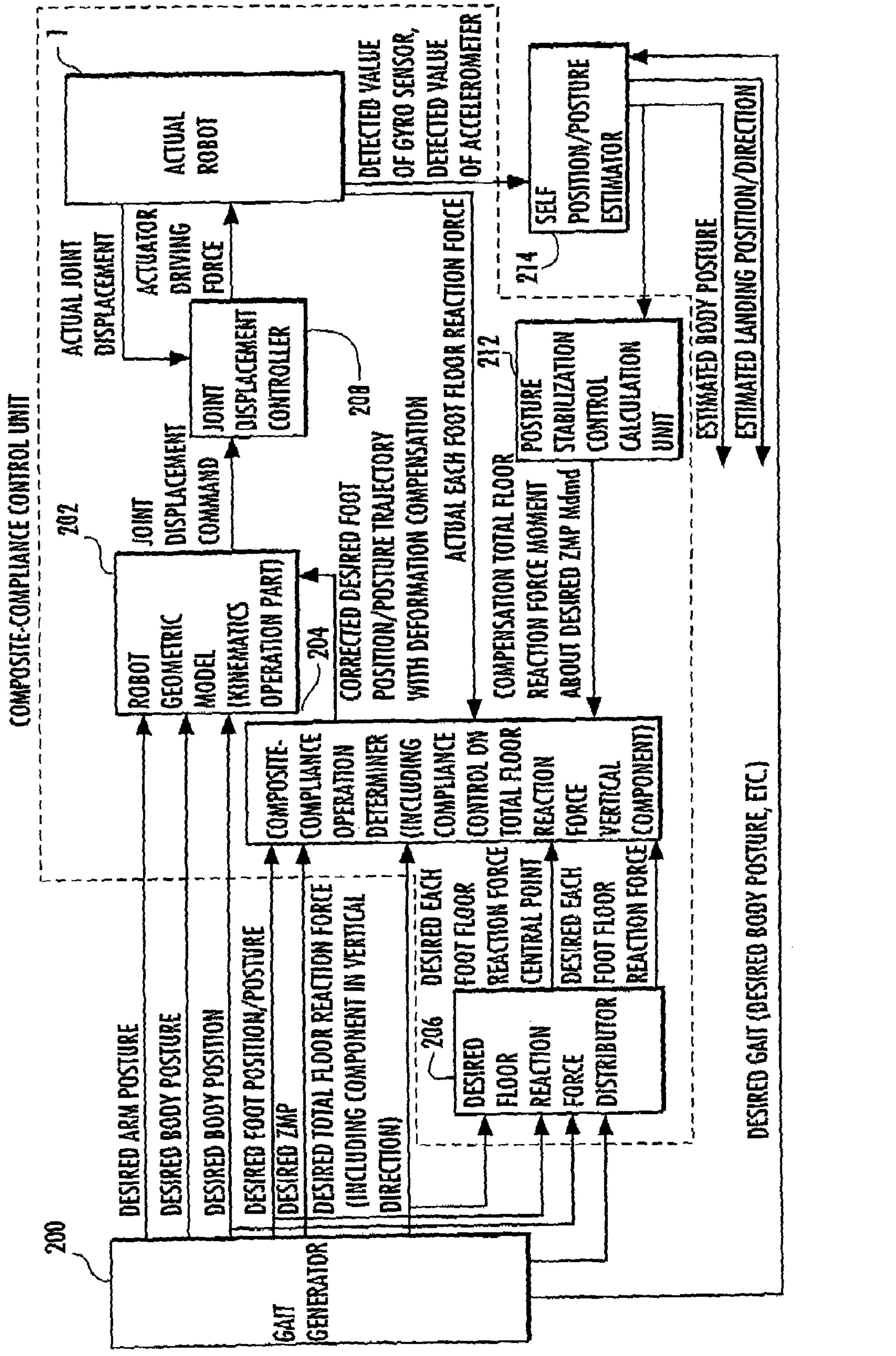
FIG. 6 is a block diagram showing a functional construction of the control unit shown in FIG. 5.

FIG. 6 is a block diagram showing the entire functional construction of a control unit of the leg type moving robot in accordance with the present embodiment. A portion except for the "actual robot" in FIG. 6 is constituted by processing functions implemented by the control unit 60 (primarily the functions of the first calculation unit 90 and the second calculation unit 92). In the following explanation, the symbols R and L will be omitted unless it is necessary to discriminate right and left of the legs 2.

The control unit 60 is equipped with a gait generator 200 for generating and outputting desired gaits of the robot 1 freely in real time, a self position/posture estimator 214, etc. The self position/posture estimator 214, details of which will be discussed later, is adapted to carry out processing related to a characteristic portion of the present invention and estimate a position and a posture (a position and a posture in a global coordinate system) of the robot 1.

A desired gait output by the gait generator 200 is constituted of a desired body position/posture trajectory (trajectory of a desired position and a desired posture of the body 3), a desired foot position/posture trajectory (trajectory of a desired position and a desired posture of each foot 22), a desired arm posture trajectory (trajectory of a desired posture of each arm 5), a desired total floor reaction force central point (desired ZMP) trajectory, and a desired total floor reaction force trajectory. If a movable part in addition to the legs 2 and the arms 5 is provided on the body 3, then a desired position/posture trajectory of the movable part is added to the desired gait.

Complementary explanation will be added to meanings or definitions of terms used in the embodiment of the present invention. The term "trajectory" in the above gait means a temporal change pattern (time series pattern), and may be referred to as "pattern" in place of "trajectory" in the following explanation. Furthermore, a "posture" of each part collectively means an inclination and direction of the part. The term "inclination" means an angle of the part relative to a vertical direction, and the term "direction" is the direction of a vector when the vector indicating a front direction of the part is projected onto a horizontal surface. For example, the inclination in a posture of a body is comprised of an inclination angle (posture angle) of the body 3 in the roll direction (about the X-axis) relative to the Z-axis (vertical axis) and an inclination angle (posture angle) of the body 3 in the pitch direction (about the Y-axis) relative to the Z-axis. The direction of the body 3 is represented by means of a rotational angle in the yaw direction (about the Z-axis) of the vector when the vector indicating a front direction of the body 3 is projected onto a horizontal surface. A foot posture is represented by means of a spatial azimuth of two axes fixedly set on each foot 22. Regarding a landing posture, in particular, of the foot 22, the landing posture basically indicates the direction of the landed foot 22. Specifically, the landing posture represents the direction of a vector when the vector directing from the heel of the landed foot 22 toward its tiptoe is projected onto a horizontal surface. A desired arm posture is represented by relative postures of all parts of the arm 5 with respect to the body 3.

A body position means a predetermined position of the body 3, specifically, the position of a preset representative point of the body 3. Similarly, a foot position means the position of a preset representative point of each of the feet 22R and 22L. A body speed means a moving speed of the aforementioned representative point of the body 3, and a foot speed means a moving speed of the aforementioned representative point of each of the feet 22R and 22L.

The term "desired" in a desired gait, such as in a desired body position/posture, will be frequently omitted in the following explanation when there is no danger of misunderstanding. Of gaits, constituent elements other than those related to a floor reaction force, that is, the gaits related to motions of the robot 1, such as a foot position/posture and a body position/posture, will be collectively referred to as "motion."

A floor reaction force (floor reaction force comprised of a translational force and moment) of each of the feet 22R, L is referred to as "reaction force of each foot," and a resultant force of the floor reaction forces of all (two) feet 22R and 22L of the robot 1 will be referred to as "total floor reaction force." In the following explanation, however, each foot floor reaction force will hardly be referred to, so that "floor reaction force" will be handled as having the same meaning as "total floor reaction force" unless otherwise specified.

A desired floor reaction force is generally expressed by a point of action, a force (translational force) applied to the point of action, and a moment of the force. The point of action may be set at any location, so that innumerable expressions are possible for the same desired floor reaction force. If, however, a desired floor reaction force is expressed using especially the aforesaid desired floor reaction force central point as the point of action, then the moment of the force will be zero except for a component of a vertical axis.

In the case of a gait that satisfies dynamic equilibrium conditions, a ZMP calculated from a desired motion trajectory (a point at which a moment of a resultant force of an inertial force and gravity of the robot 1 calculated from the desired motion trajectory acts about the point becomes zero except for a vertical-axis component) agrees with a central point of a desired total floor reaction force. Therefore, providing a desired ZMP trajectory can be regarded as equivalent to providing a desired total floor reaction force central point trajectory (refer to, for example, PCT publication of unexamined application WO/02/40224 by the present applicant for details).

From the background described above, in the description of PCT publication of unexamined application WO/02/40224, a desired gait has been defined as follows:

a) In a broad sense, a desired gait is a set of a desired motion trajectory of a period of one step or a plurality of steps and a desired floor reaction force trajectory.

b) In a narrow sense, a desired gait is a set of a desired motion trajectory of a period of one step and its ZMP trajectory.

c) A series of gaits is formed of several connected gaits.

To walk the robot 1, a vertical position of the body (a height of the body) is determined by the body height determining technique proposed previously in Japanese Unexamined Patent Application Publication No. 10-86080 by the present applicant. This subordinately determines a translational force component of a floor reaction force, so that ZMP alone has been adequate as a physical amount to be explicitly set for the floor reaction force of a desired gait. Accordingly, in the description of PCT publication of unexamined application WO/02/40224, the above b) has been adequate as the desired gait in the narrow sense. To run the robot 1, a floor reaction force vertical component is also important for control, so that it is preferable to explicitly set the floor reaction force vertical component. For this reason, the following b') has been adopted for a desired gait in a narrow sense in PCT application (PCT/JP02/13596) previously proposed by the present applicant.

b') A desired gait in a narrow sense is a set of a desired motion trajectory of a period of one step, a ZMP trajectory thereof, and a trajectory of a floor reaction force vertical component.

In the present description, the term "desired gaits" used hereinafter will mean the desired gaits in a narrow sense unless otherwise specified. Furthermore, the term "one step" of a desired gait will mean a period from the moment one leg 2 of the robot 1 touches the ground to the moment the other leg 2 touches the ground.

Needless to say, a two-leg supporting period will refer to a period during which the robot 1 supports its own weight by the two legs 2, 2, a one-leg supporting period will refer to a period during which the robot 1 supports its own weight only by one leg 2, and a floating period will refer to a period during which the two legs 2, 2 are apart from a floor (in the air).

In the one-leg supporting period, the leg 2 not supporting the self-weight of the robot 1 will be referred to as a "free leg," and the leg 2 supporting the self-weight will be referred to as a "supporting leg." While the robot 1 is walking, the two-leg supporting period and the one-leg supporting period are alternately repeated. While the robot 1 is running, the one-leg supporting period and the floating period are alternately repeated. In this case, during the floating period of running, both legs 2, 2 do not support the self-weight of the robot 1; however, the leg 2 that was a free leg and the leg 2 that was a supporting leg during a one-leg supporting period immediately before the floating period will be referred to as a "free leg" and a "supporting leg," respectively, even in the floating period.

Positions/postures of individual parts of the robot 1 in desired gaits, including a desired body posture, a desired body position, a desired foot position/posture, and a desired arm posture, will be described by means of a supporting leg coordinate system. The supporting leg coordinate system is a coordinate system fixed to a floor surface having its origin near a ground contact surface of the foot 22 of a supporting leg. More detailedly, as described in U.S. Pat. No. 3,273,443 by the present applicant, in the coordinate system, the origin is a point of the center of an ankle joint of the supporting leg vertically projected toward the ground contact surface when the foot 22 of the supporting leg is rotated to a horizontal posture without causing the foot 22 to slip on the ground contact surface. A horizontal axis (an axis in the longitudinal direction of the foot 22) extending toward a tiptoe of the supporting leg foot 22 provides the X-axis, a vertical axis provides the Z-axis, and a coordinate axis (axis in the lateral direction of the foot 22) orthogonal to these X-axis and Z-axis provides the Y-axis.

The gait generator 200 according to the embodiment of the present invention uses landing positions/postures of the foot 22 of a free leg and required values (desired values) of landing time up to two steps ahead as inputs to generate a desired gait composed of a desired body position/posture trajectory, a desired foot position/posture trajectory, a desired ZMP trajectory, a desired floor reaction force vertical component trajectory, and a desired arm posture trajectory. At this time, some of parameters defining these trajectories (referred to as gait parameters) are corrected to satisfy continuity of a gait.

To generate desired gaits, a dynamic model of the robot 1 is used. As the dynamic model, for example, a simplified model described in the aforesaid PCT publication of unexamined application WO/02/40224 or a multi-mass point model (full model) disclosed in Japanese Unexamined Patent Application Publication No. 2002-326173 proposed by the present applicant may be used.

The gait generator 200 defines a desired gait (desired gait in the narrow sense) for one step from the moment one leg 2 of the robot 1 touches the ground to the moment the other leg 2 touches the ground as a unit, and generates the desired gait for the one step in order. Here, a gait that is currently being generated or will be generated will be referred to as a "current time gait," the next time gait will be referred to as a "next time gait," and a gait after next will be referred to as a "next but one time gait." Furthermore, a desired gait generated one step before the "current time gait" will be referred to as a "last time gait."

Some of desired gaits generated by the gait generator 200 will be illustratively outlined. For example, a desired foot position/posture trajectory is generated using a finite-duration setting filter disclosed in U.S. Pat. No. 3,233,450 by the present applicant. In the processing for generating a foot position/posture trajectory by the finite-duration setting filter, a foot position trajectory, for example, is generated such that the foot 22 starts moving toward a desired landing position (a required value of the landing position) while gradually accelerating its speed, and then gradually decelerate its speed to zero or substantially to zero by desired landing time (a required value of landing time) so as to stop when it reaches the desired landing position at the desired landing time. The same applies to a foot posture trajectory. In the desired foot position/posture trajectory thus generated, a ground speed at a landing moment is zero or substantially zero, so that a landing impact at landing from the aforesaid floating period can be reduced especially when running the robot 1.

Figure 7:
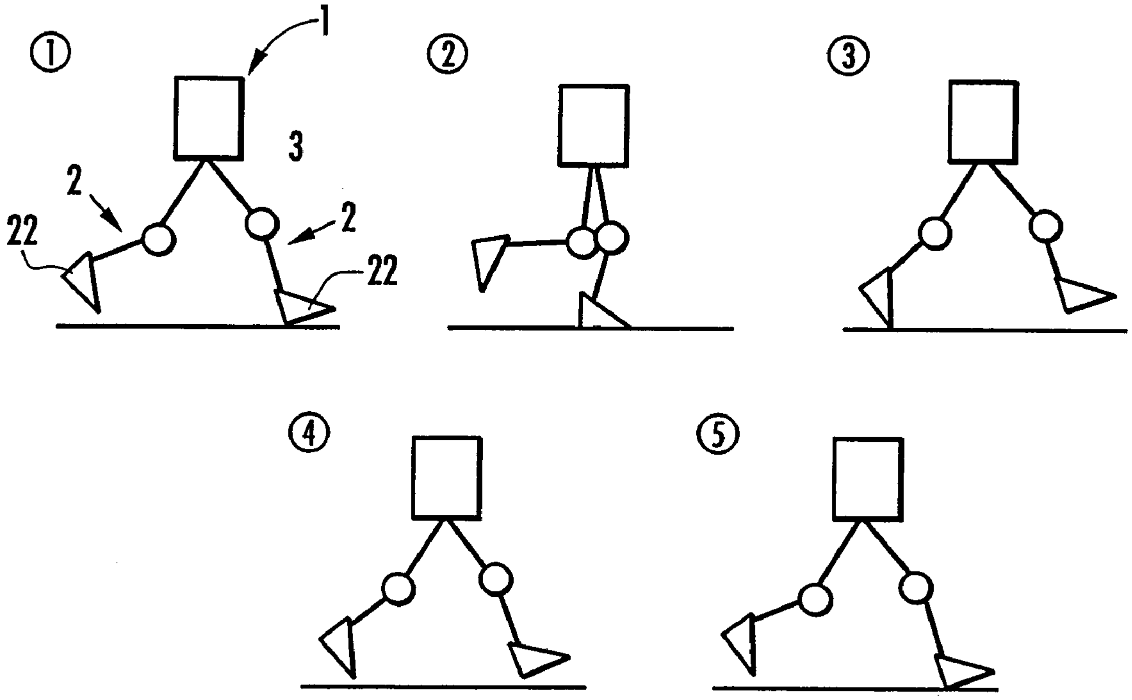
FIG. 7 is an explanatory diagram showing a running gait of the robot.
Figure 8:
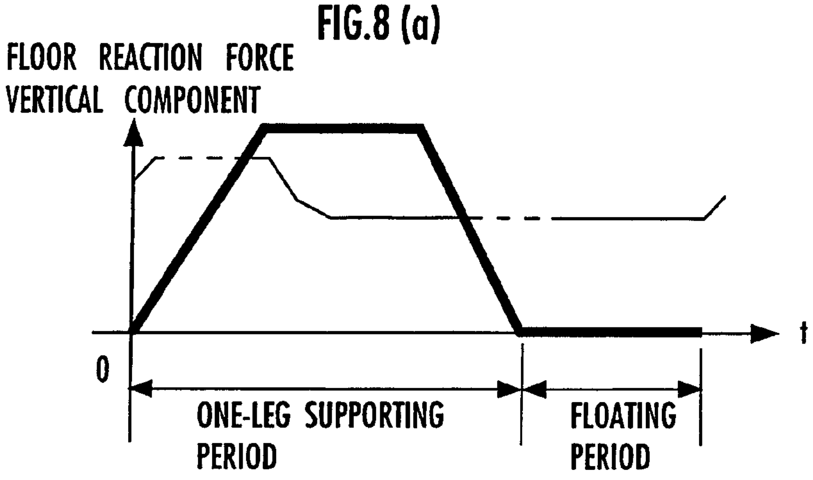
FIGS. 8(*a*), (*b*), and (*c*) are graphs illustrating a floor reaction force vertical component of a desired gait, a desired ZMP, and a setting example of a gain for estimating a self position/posture, respectively.
Figure 8:
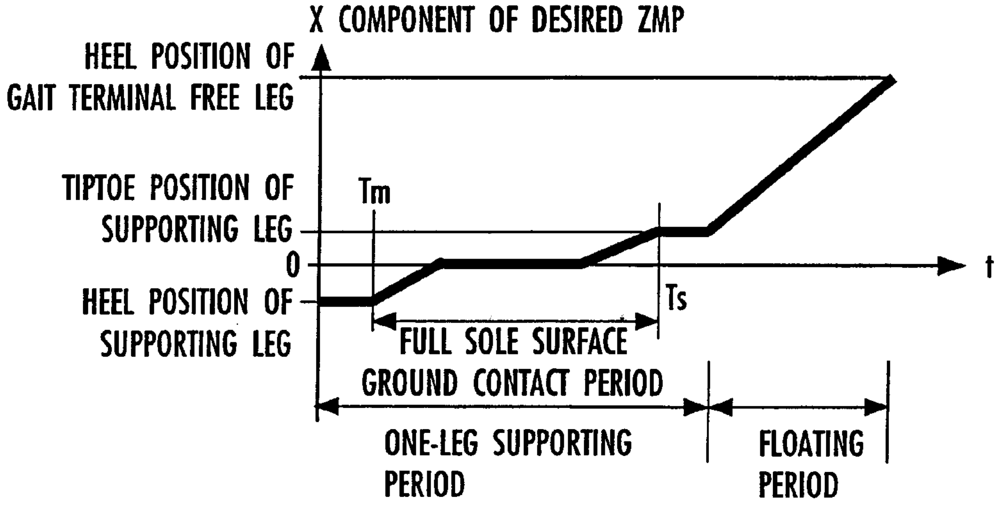
Figure 8:
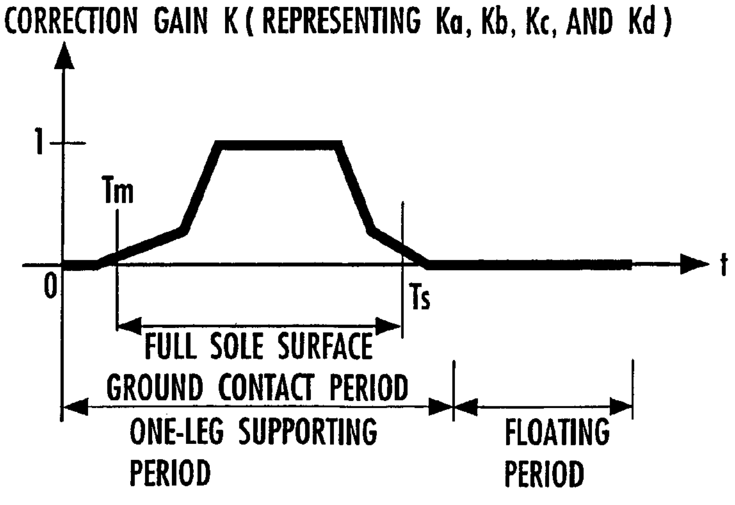

When running the robot 1 in the same manner as a human runs, as shown in FIG. 7, a desired floor reaction force vertical component trajectory and a desired ZMP trajectory (specifically, a desired ZMP trajectory in the X-axis direction of the supporting leg coordinate system (the longitudinal direction of the supporting leg foot 22)), for example, are set by the patterns indicated by solid lines in FIG. 8(*a*) and FIG. 8(*b*), respectively. First through third diagrams of FIG. 7 schematically show motional states of the two legs 2, 2 of the robot 1 at a start point, a mid point, and an end point of the one-leg supporting period, and a fourth diagram and a fifth diagram schematically illustrate motional states of the two legs 2, 2 of the robot 1 at a mid point of the floating period and an end point of the floating period (the start point of the next one-leg supporting period).

When running the robot 1, a desired floor reaction force vertical component trajectory basically exhibits a pattern jutting upward in the one-leg supporting period, and maintains zero during the floating period. When walking the robot 1, the desired floor reaction force vertical component trajectory is set, for example, as indicated by the two-dot chain line in FIG. 8(*a*). In this case, the upwardly protuberant portion of the two-dot chain line corresponds to the two-leg supporting period, while the downwardly protuberant portion corresponds to the one-leg supporting period. Regardless of whether the robot 1 is running or walking, the desired ZMP is basically set around the center in the ground contact surface (more specifically, in a so-called supporting polygon) of the leg 2 of the robot 1.

Figure 9:
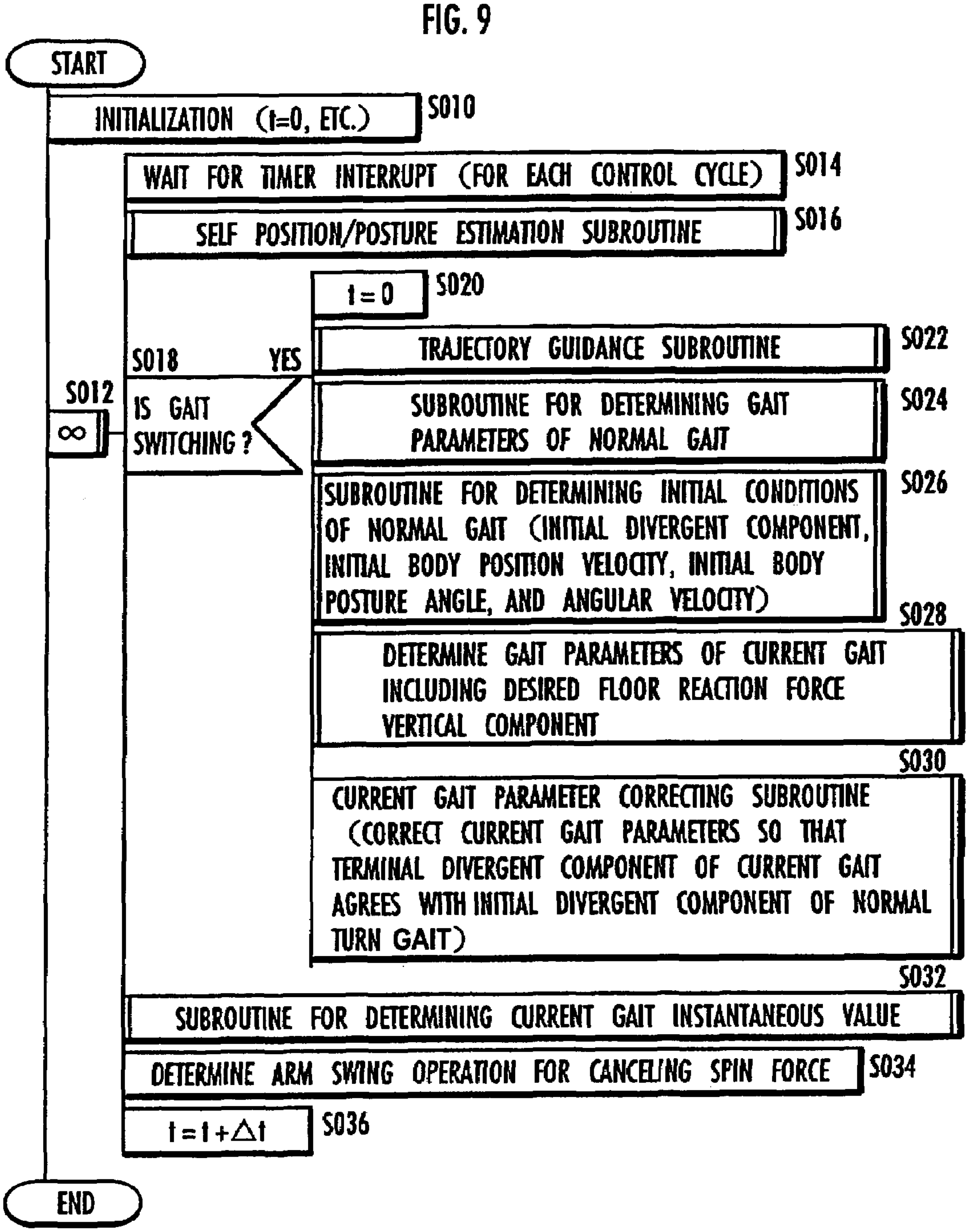
FIG. 9 is a flowchart showing a processing of an essential section of a control unit in a first embodiment.

FIG. 9 is a flowchart (structural flowchart) showing gait generation processing of the gait generator 200 and a self position/posture estimation processing of the self position/posture estimator 214 shown in FIG. 6.

First, various initializing operations, such as initializing time t to zero, are performed in S010.

Next, the program proceeds to S014 via S012 and waits for a timer interrupt for each control cycle. The control cycle is denoted by Δt.

Then, the program proceeds to S016 to estimate self position/posture by the self position/posture estimator 214. The processing in S016 constitutes a characteristic of the self position/posture estimator of the leg type moving robot in accordance with the present application. This will be explained hereinafter.

Subsequently, the program proceeds to S018 to determine whether a gait is switching (whether it is the time to start generating a new current time gait after completion of generating a last time gait). If the determination result is YES, then the program proceeds to S020, or if it is NO, then the program proceeds to S032. Processing after S020, which will be explained below, has been explained in detail in PCT publication of unexamined application WO/02/40224 or the aforesaid PCT application PCT/JP02/13596 previously proposed by the present applicant; therefore, only a brief explanation will be given in the present description.

When proceeding to S020, time t is initialized to zero. The program then proceeds to S022 to read a next time gait's supporting leg coordinate system (specifically the position and direction), a next but one time gait's supporting leg coordinate system (specifically the position and direction), and the current time gait's cycle and the next time gait's cycle.

The next time gait's supporting leg coordinate system and the next but one time gait's supporting leg coordinate system are determined according to the definitions of the aforesaid supporting leg coordinate systems on the basis of a required value of a landing position/posture (desired landing position/posture) of a free leg foot 22 of a first step (the free leg foot 22 of the current time gait) and a required value of a landing position/posture (desired landing position/posture) of a free leg foot 22 of a second step (the free leg foot 22 of the next time gait) specified primarily by operating the joystick 73.

The current time gait's cycle and the next time gait's cycle are determined on the basis of a required value of landing time (desired landing time) of the free leg foot 22 of the first step and a required value of landing time (desired landing time) of the free leg foot 22 of the second step.

The aforesaid required values of landing position/posture and the required values of landing time of the free leg foot 22, or positions and directions in the supporting leg coordinate systems and gait cycles may be stored beforehand as walking schedules, or they may be determined on the basis of commands (requests) from a steering device, such as the joystick 73, and a walking history up to that moment.

Then, the program proceeds to S024 wherein gait parameters of a normal turning gait connected to the current time gait are determined on the basis of mainly the next time gait's supporting leg coordinate system, the next but one time gait's supporting leg coordinate system, the current time gait's cycle, and the next time gait's cycle determined in S022. Primarily, a foot trajectory parameter defining a desired foot position/posture trajectory, a reference body posture trajectory parameter defining a reference trajectory of a desired body posture, an arm posture trajectory parameter defining a desired arm posture trajectory, a ZMP trajectory parameter defining a desired ZMP trajectory, and a floor reaction force vertical component trajectory parameter defining a desired floor reaction force vertical component trajectory are determined. To illustrate, for example, the floor reaction force vertical component trajectory parameter, time and value of a bend point of the pattern shown in FIG. 8(*a*) are determined as the floor reaction force vertical component trajectory parameter.

Here, the normal turning gait means a cyclic gait that is free of discontinuity in a motional state of the robot 1 at a boundary of the gait when the gait is repeated ("normal turning gait" may hereinafter be abbreviated to "normal gait").

A one-cycle gait of the normal turning gait is composed of a first turning gait and a second turning gait. The first turning gait corresponds to a gait in which the supporting leg foot 22 corresponding to the supporting leg coordinate system of the current time gait is moved to a position/posture corresponding to the next but one time gait's supporting leg coordinate system. The second turning gait corresponds to a gait in which the supporting leg foot 22 corresponding to the supporting leg coordinate system of the next time gait is moved to a position/posture corresponding to a next but two time gait's supporting leg coordinate system. In this case, the next but two gait supporting leg coordinate system corresponds to a desired landing position/posture of the free leg foot 22 of the second turning gait. Furthermore, the next but two gait supporting leg coordinate system is set such that the position/posture (position and direction) of the next but two gait supporting leg coordinate system observed from the next but one time gait's supporting leg coordinate system (the supporting leg coordinate system of the second turning gait) agrees with the position/posture (position and direction) of the next time gait's supporting leg coordinate system (landing position/posture of the free leg foot 22 of the current time gait) observed from the current time gait supporting leg coordinate system. The term "turning" is used for normal turning gaits, because it means moving straight when a turning rate is set to zero, and moving straight can be included in turning in a broad sense.

Normal turning gaits are virtual cyclic gaits provisionally prepared to determine a divergent component at an end of the current time gait or a body vertical positional speed by the gait generator 200, and are not directly output from the gait generator 200 to actually control the robot 1.

The term "divergent" means that the position of the body shifts away from the positions of the two foot portions (feet). A value of a divergent component is a numeral value indicating how far the position of the body of the bipedal moving robot shifts from the positions of the two foot portions (feet) (strictly speaking, a numeral value indicating how far it shifts from the origin of a supporting leg coordinate system set on a supporting leg ground contact surface, and it is expressed by a position of the body 3 in the horizontal direction and a speed function thereof.

In the present embodiment, a normal gait following the current time gait to be generated is set on the basis of a move request (a required value of a landing position/posture of the foot 22 of a free leg up to the next two steps and landing time or the like), and an initial divergent component of a normal gait is determined, and then the current time gait is generated so that a terminal divergent component of the current time gait agrees with the initial divergent component of the normal gait. The details of S024 have been explained in the aforesaid PCT publication of unexamined application WO/02/40224 or PCT/JP02/13596 proposed by the present applicant, so that any further explanation will be omitted.

After the processing shown by S010 through S024 is carried out, the program proceeds to S026 wherein an initial condition (an initial body horizontal positional velocity component, an initial body vertical positional velocity, an initial divergent component, and an initial body posture angle and an angular velocity) of the normal turning gait is determined. The details of S026 have been explained in the aforesaid PCT publication of unexamined application WO/02/40224 or PCT/JP02/13596, so that any further explanation will be omitted.

Subsequently, the program proceeds to S028 wherein gait parameters for the current time gait are determined (some being provisionally determined). In this case, the gait parameters for the current time gait to be determined mainly include a foot trajectory parameter, a reference body posture trajectory parameter, an arm posture trajectory parameter, a desired ZMP trajectory parameter, and a desired floor reaction force vertical component trajectory parameter, as in the case of the gait parameters for a normal turning gait. The trajectories defined by the individual parameters are determined so that they continue to the trajectory of the normal turning gait. Among these parameters, however, the desired ZMP trajectory parameter is provisional. The details of the processing of S028 have been explained in the aforesaid PCT publication of unexamined application WO/02/40224 or PCT/JP02/13596, etc. so that any further explanation will be omitted.

Next, the program proceeds to S030 wherein a gait parameter of the current time gait is corrected so that a terminal divergent component of the current time gait agrees with an initial divergent component of a normal gait. The gait parameter corrected here is the desired ZMP trajectory parameter.

After the current time gait parameter is corrected in S030, or if a determination result of S018 is NO, then the program proceeds to S032 to determine a current time gait instantaneous value. The details of the processing have been explained in the aforesaid PCT publication of unexamined application WO/02/40224 or PCT/JP02/13596, etc. so that any further explanation will be omitted.

The program then proceeds to S034 wherein an arm swinging operation for canceling a spin force is determined, as in the case of the processing of S032 in an embodiment of PCT application No. PCT/JP02/13596.

The program then proceeds to S036 wherein it increases gait generating time t by Δt, and returns to S014 to continue generating gaits as described above.

The above describes the processing for generating desired gaits carried out in the gait generator 200, and the processing for estimating self positions/postures carried out in the self position/posture estimator 214.

Referring to FIG. 6, control processing by the control unit 60 according to the present embodiment will be further explained. In the gait generator 200, desired gaits are generated, as described above. Among generated desired gaits, a desired body position/posture (trajectory) and a desired arm posture trajectory are directly sent to a robot geometric model (inverse kinematics operation part) 202.

A desired foot position/posture (trajectory), a desired ZMP trajectory (desired total floor reaction force central point trajectory), and a desired total floor reaction force (trajectory) (a desired floor reaction force horizontal component and a desired floor reaction force vertical component) are directly sent to a composite-compliance operation determiner 204 and also to a desired floor reaction force distributor 206. In the desired floor reaction force distributor 206, a desired total floor reaction force is distributed to the feet 22R and 22L, and a desired floor reaction force central point of each foot and a desired floor reaction force of each foot are determined. The desired floor reaction force central point of each foot and the desired floor reaction force of each foot that have been determined are sent to the composite-compliance operation determiner 204.

The composite-compliance operation determiner 204 generates a corrected desired foot position/posture trajectory with deformation compensation and sends it to the robot geometric model 202. Upon receipt of a desired body position/posture (trajectory) and a corrected desired foot position/posture (trajectory) with deformation compensation, the robot geometric model 202 calculates joint displacement commands (values) of twelve joints (10R(L), etc.) of the legs 2, 2 that satisfy them and sends the calculated commands to a displacement controller 208. The displacement controller 208 performs follow-up control on the displacements of the twelve joints of the robot 1, using the joint displacement commands (values) calculated by the robot geometric model 202 as desired values.

A floor reaction force generated in the robot 1 (more specifically, an actual floor reaction force of each foot) is detected by the six-axis force sensor 50. The detected value is sent to the composite-compliance operation determiner 204. As will be discussed later in relation to S016 of FIG. 9, inclination components, namely, actual body posture angle errors θerrx and θerry, in a difference between an estimated body posture determined and a desired body posture generated by the gait generator 200 are supplied to a posture stabilization control operation part 212. θerrx denotes an inclination component in the roll direction (about the X-axis) and θerry denotes an inclination component in the pitch direction (about the Y-axis). The posture stabilization control operation part 212 calculates a compensation total floor reaction force moment Mdmd about a desired total floor reaction force central point (desired ZMP) for restoring the inclination of the body posture of the robot 1 to the inclination of the body posture of a desired gait. The compensation total floor reaction force moment Mdmd is supplied to the composite-compliance operation determiner 204. The composite-compliance operation determiner 204 modifies a desired foot position/posture on the basis of an input value. More specifically, the composite-compliance operation determiner 204 modifies the desired foot position/posture received from the gait generator 200 to determine the corrected desired foot position/posture (trajectory) with deformation compensation such that an actual total floor reaction force (a resultant force of all actual foot floor reaction forces, including both translational force and moment) agrees with a resultant force of the desired total floor reaction force, which is the resultant force of individual desired foot floor reaction forces, and the total compensation floor reaction force moment Mdmd. It is actually impossible, however, to make every state agree with a desired state, so that a trade-off relationship is established therebetween to make them compromisingly agree with each other. More specifically, control errors with respect to desired foot positions/postures and desired floor reaction forces are weighted, and control is carried out to minimize the weighting average of control errors (or squares of control errors).

Complementarily, a corrected desired foot position/posture (trajectory) with deformation compensation is a desired foot position/posture (trajectory) obtained by determining a deformation amount of a deformation mechanism (a columnar rubber, a sole sponge, and a bag-shaped air damper for absorbing shocks) of a foot required to generate a desired value of a floor reaction force corrected by the composite-compliance operation determiner 204 by using a dynamic model (a spring damper model or the like) of the deformation mechanism, and then by making a correction so that the determined deformation amount is generated.

Figure 10:
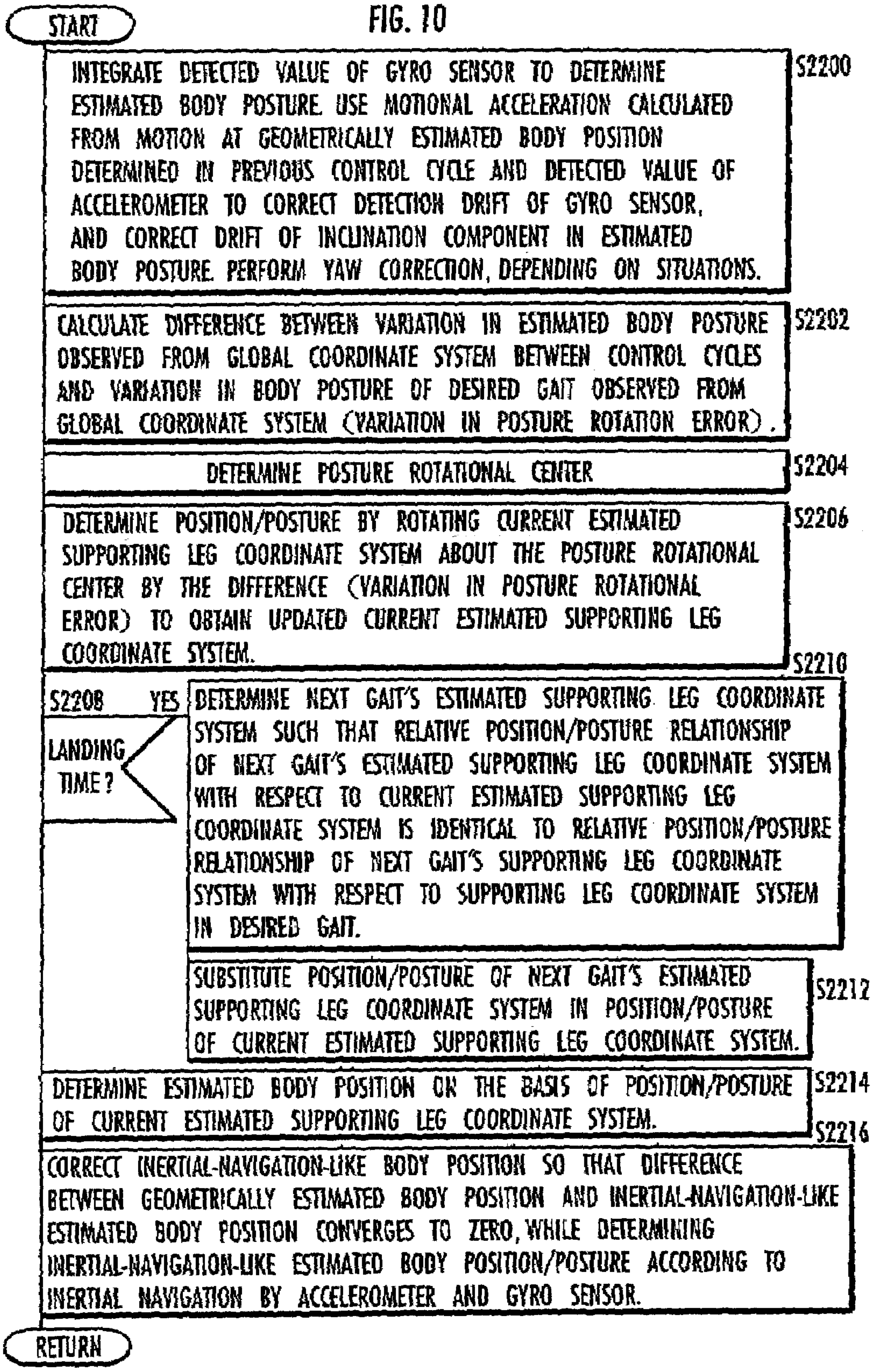
FIG. 10 is a flowchart showing a processing for estimating the self position/posture in the flowchart shown in FIG. 9.

The following will explain in detail self position/posture estimation processing in S016 in the present embodiment with reference to FIG. 10 showing a flowchart thereof.

In S2200 of FIG. 10, detected values of the gyro sensor provided in the inclination sensor 54 of the body 3, that is, angular velocities (angular velocities in three-axis directions) of the body 3, are integrated by an integrator to determine an estimated body posture (hereinafter referred to as an inertial-navigation-like estimated body posture in some cases). The estimated body posture is described in terms of a global coordinate system. In this processing, drift correction for correcting a drift from accumulation of integration errors of the detected values of the gyro sensor is also performed using mainly an estimated body position, which is an estimated value of a body position determined by the processing from S2202 to S2214 to be discussed hereinafter in a previous control cycle (a preceding or earlier control cycle). This will be discussed in more detail hereinafter.

Subsequently, the program proceeds to S2202 to calculate a difference between a variation in an estimated body posture observed from the global coordinate system (an estimated body posture determined in S2200) between control cycles (between the preceding control cycle and the present control cycle) and a variation in a body posture of a desired gait observed from the global coordinate system between the control cycles, as a variation in posture rotational error. In other words, the difference between a changing speed of an estimated body posture observed from the global coordinate system and a changing speed of a desired body posture is calculated as a variation in the posture rotational error.

The body posture of a desired gait observed from the global coordinate system refers to the body posture observed from the global coordinate system when it is assumed that the robot 1 has moved according to the desired gait without the body 3 inclining its posture or spinning (shifting from a desired body posture) during a control cycle on the current estimated supporting leg coordinate system (more specifically, on an estimated supporting leg coordinate system determined in the preceding control cycle). However, the estimated supporting leg coordinate system refers to a supporting leg coordinate system corresponding to an estimated position/posture of the supporting leg foot 22 of the actual robot 1. This means that the estimated supporting leg coordinate system is defined by the aforesaid supporting leg coordinate system, more specifically, it is a coordinate system wherein its origin is a point of the center of an ankle of the supporting leg vertically projected toward a ground contact surface when the foot 22 of the supporting leg of the actual robot 1 is rotated from the estimated position/posture to a horizontal posture without allowing the foot 22 to slip against the ground contact surface, the horizontal axis toward a tiptoe of the supporting leg foot 22 being defined as the X-axis, the vertical axis being defined as the Z-axis, and a coordinate axis orthogonal to these axes being defined as the Y-axis.

The program then proceeds to S2204 to determine a posture rotational center. To be more specific, a desired ZMP at a particular moment (a current value of the desired ZMP) is determined as the posture rotational center. In a floating period while the robot 1 is running, the gravity of the robot 1 in, for example, a desired gait is determined as the posture rotational center.

Figure 11:
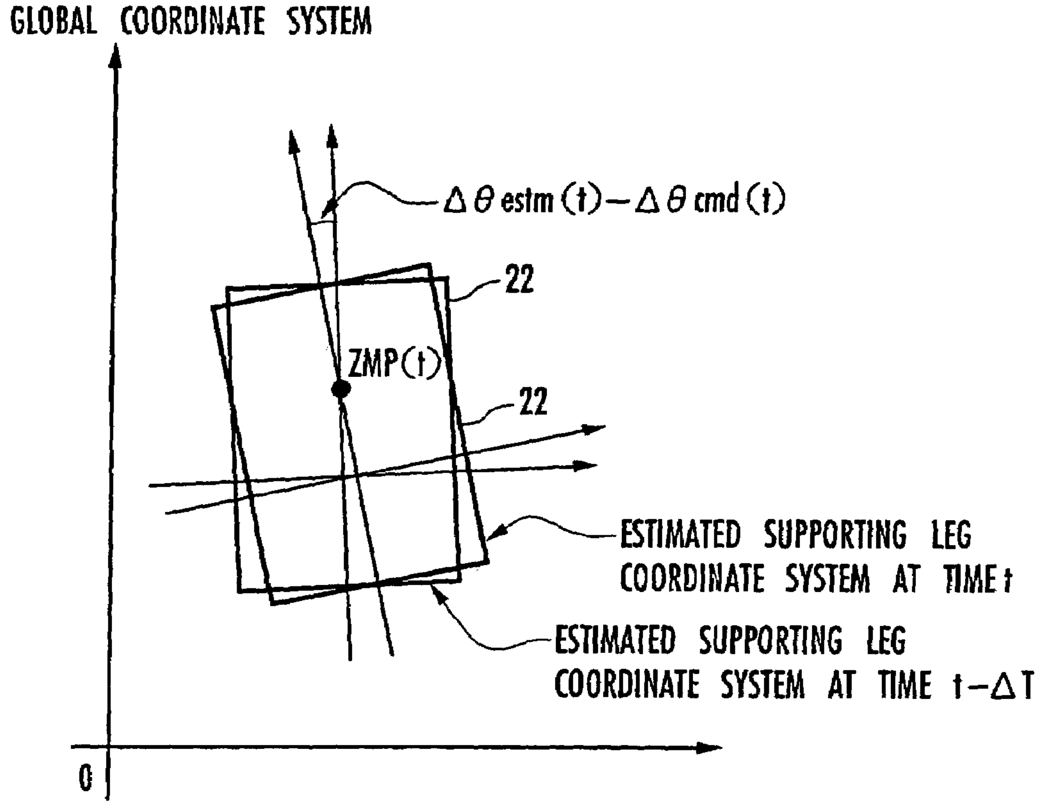
FIG. 11 and FIG. 12 are diagrams for explaining the processing for estimating the self position/posture in the flowchart of FIG. 9.

The program then proceeds to S2206 to determine the position and posture obtained by rotating the current estimated supporting leg coordinate system (the estimated supporting leg coordinate system determined in the preceding control cycle, which is the estimated supporting leg coordinate system at time t-Δt shown in FIG. 11) about the posture rotational center by the aforesaid variation in posture rotational error, as the new current estimated supporting leg coordinate system (the estimated supporting leg coordinate system at time t shown in FIG. 11).

The origin and the directions of the coordinate axes of the estimated supporting leg coordinate system are represented by a global coordinate system. It is assumed that initial values of the estimated supporting leg coordinate system (initial position/posture in the global coordinate system) have been set during initialization processing in S010.

The rotational center of the estimated supporting leg coordinate system means a rotational center of slippage rotation of the supporting leg foot 22 in normal walk, which is free of a floating period. In the floating period in a running motion or the like wherein a supporting leg is also apart from a floor during one step, no slippage of the supporting leg foot 22 takes place in a narrow sense. For this reason, a posture rotation (or spin) in the air is preferably expressed by means of a rotation about the rotational center of the estimated supporting leg coordinate system. However, in a broad sense, the "slippage of a supporting leg foot" may be defined as a posture rotation about the rotational center of the estimated supporting leg coordinate system.

Complementarily, the supporting leg coordinate system is set with respect to the ground contact surface of the supporting leg foot 22, and the origin thereof may not be the one vertically projected from the center of the ankle of the supporting leg to the ground contact surface as described above. In other words, the supporting leg coordinate system is a local coordinate system set on a virtual floor in the vicinity of the supporting leg foot 22 for describing motions of the robot 1. In effect, the phenomenon of a posture rotation (or spin) of the robot 1 is regarded as a phenomenon in which the virtual floor is posture-rotated (or spun) about a predetermined point in a global coordinate system, as its rotational center, together with the entire robot, while maintaining a state wherein the robot 1 is in motion without relatively posture-rotating (or spinning) on the virtual floor.

In other words, the motion of the robot 1 may be regarded as a perturbational rotation in which the entire robot 1 in motion according to desired gaits or detected joint displacement values in a local coordinate system rotates, together with the local coordinate system, about a predetermined point as its rotational center (posture rotational center) with respect to the global coordinate system.

Hence, the posture rotational center may be defined as the rotational center of an estimated supporting leg coordinate system and also as the rotational center of the perturbational rotation.

Generally, the Z-axis of the current estimated supporting leg coordinate system after the posture rotation in S2206 is not oriented in a vertical direction. Therefore, after the posture rotation, the Z-axis of the current estimated supporting leg coordinate system may be returned in the vertical direction (a next time gait's estimated supporting leg coordinate system may be rotated about its origin by the inclination angle of the Z-axis relative to the vertical direction). Alternatively, during the posture rotation processing in S2206, the estimated supporting leg coordinate system may be rotated by a component about a vertical axis (spinning component) out of the aforesaid variation in posture rotational error.

The program then proceeds to S2208 in which it is determined whether landing time has been reached, i.e., whether it is a gait switching moment.

Figure 12:
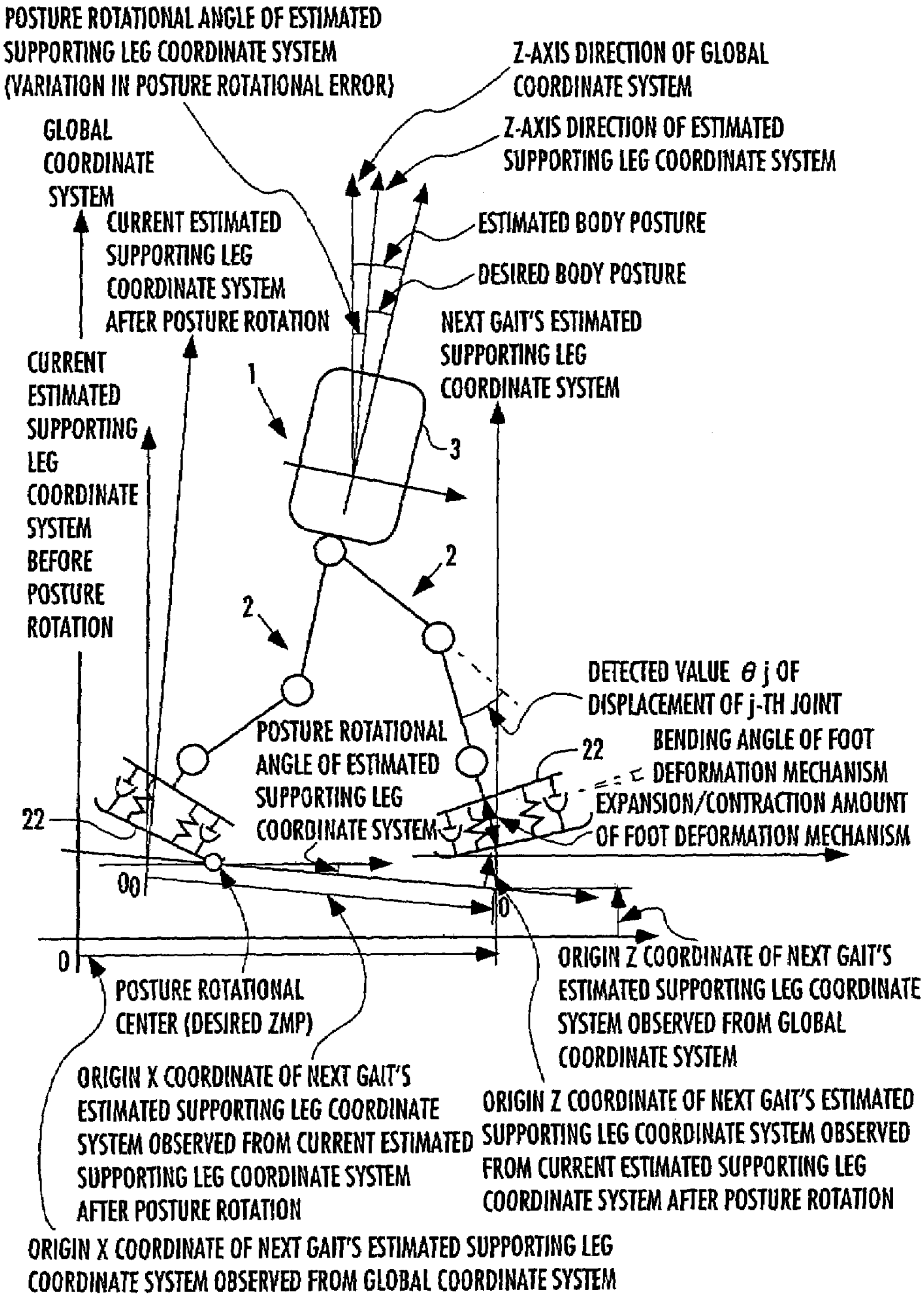

If the determination result in S2208 is YES, then the following processing is carried out. First, the program proceeds to S2210 wherein a next time gait's estimated supporting leg coordinate system is determined such that the relative position/posture relationship of the next time gait's estimated supporting leg coordinate system with respect to the current estimated supporting leg coordinate system (the estimated supporting leg coordinate system after the posture rotation in S2206) will be the same as the relative position/posture relationship of the next time gait's supporting leg coordinate system with respect to the supporting leg coordinate system in a desired gait (last time gait), as illustrated in FIG. 12. The next time gait's supporting leg coordinate system in this case means the supporting leg coordinate system of the gait following the last time gait (i.e., the current time gait), rather than the next time gait's supporting leg coordinate system for the current time gait to be generated. The supporting leg coordinate system of a desired gait is a coordinate system having its Z-axis oriented in the vertical direction, so that the Z-axis of the next time gait's estimated supporting leg coordinate system that satisfies the aforesaid relative position/posture relationship with respect to the current estimated supporting leg coordinate system after a posture rotation is not usually oriented in the vertical direction. In the present embodiment, therefore, a next time gait's estimated supporting leg coordinate system is eventually determined by returning, in the vertical direction, the Z-axis of the next time gait's estimated supporting leg coordinate system that satisfies the above relative position/posture relationship with respect to the current estimated supporting leg coordinate system after a posture rotation (the next time gait's estimated supporting leg coordinate system is rotated about its origin by an inclination angle of the Z-axis relative to the vertical direction). In S2206, if the Z-axis of the estimated supporting leg coordinates is oriented in the vertical direction, as described above, then the processing for returning the Z-axis of the next time gait's estimated supporting leg coordinate system in the vertical direction in S2210 will be unnecessary.

Subsequently, the program proceeds to S2212 in which the position/posture of the next time gait's estimated supporting leg coordinate system (the position of the origin and the directions of the coordinate axes) determined in S2210 is substituted into the position/posture of the current estimated supporting leg coordinate system. In other words, the position/posture of the current estimated supporting leg coordinate system is replaced by the position/posture of the next time gait's estimated supporting leg coordinate system.

After S2212 or if the determination result of S2208 is NO, then the program proceeds to S2214 wherein an estimated body position, which is an estimated value of the body position in a global coordinate system, is determined on the basis of the position/posture of the current estimated supporting leg coordinate system. However, the relationship of the estimated body position relative to the current estimated supporting leg coordinate system is set to agree with the relationship of the body position (desired body position) with respect to the supporting leg coordinate system of a desired gait (desired gait determined in a previous control cycle).

Next, the program proceeds to S2216 wherein an inertial-navigation-like estimated body position/posture is determined according to the inertial navigation by the accelerometer and the gyro sensor provided in the inclination sensor 54, and the inertial-navigation-like body position is corrected so that the difference between a geometrically estimated body position and the inertial-navigation-like estimated body position is converged to zero. More details of this processing will be discussed hereinafter.

The above is the outline of the self position/posture estimation processing in S016 of FIG. 9.

In S2210, desired gaits have been used to determine the next time gait's estimated supporting leg coordinate system. Alternatively, however, a next time gait's estimated supporting leg coordinate system may be determined as described below when walking the robot 1.

First, based on a current (landing instant) detected joint displacement value of the robot 1, actual free leg foot position/posture (the position/posture of the front foot 22 of the robot 1 in the example shown in FIG. 12) at landing in a current estimated supporting leg coordinate system is estimated by kinematics computation. Hereinafter, the estimated actual free leg foot position/posture at landing will be referred to as an estimated free leg foot position/posture at landing.

At this time, however, it is assumed that the robot 1 is in motion according to a detected joint displacement value without the foot 22 of the supporting leg slipping relative to a virtual floor on the current estimated supporting leg coordinate system while the robot 1 maintains a body posture based on a desired gait on the current estimated supporting leg coordinate system.

Complementarily, it is assumed that the robot 1 maintains the body posture based on the desired gait on the current estimated supporting leg coordinate system rotated about the posture rotational center by the variation in posture rotational error in order to make the body posture in the assumed figure match with the estimated body posture in a global coordinate system at that moment. Hence, when rotating the current estimated supporting leg coordinate system only by a vertical axis component (spin component) in the variation in posture rotational error rather than posture-rotating it by the aforesaid difference, it is assumed that the robot 1 is in motion based on a detected joint displacement value without slippage of the foot 22 of the supporting leg relative to a virtual floor on a current estimated supporting leg coordinate system while the robot 1 maintains the direction of the body based on a desired gait on the current estimated supporting leg coordinate system with the inclination of the body agreeing with an inclination component of the variation in the posture rotational error.

At this time, based on at least one of a detected floor reaction force value by the six-axis force sensor 50 and a floor reaction force of a desired gait, a variation in the deformation mechanism of the foot 22 (the elastic member 106, the ground contact member (sole elastic member) 71, the bag-shaped member 109, etc. shown in FIG. 3 and FIG. 4) may be determined using a dynamic model (a spring damper model or the like) of the deformation mechanism, and an estimated free leg foot position/posture at landing may be determined, including (considering) the deformation amount. More specifically, as the figure of the robot 1 shown in FIG. 12, an entire figure (an entire figure of the robot 1 at that moment) is determined when a body posture is defined as a desired body posture in a current estimated supporting leg coordinate system, and a joint displacement is defined as a detected joint displacement value (a j-th detected joint displacement value θj, j=1, 2 . . . ), and a variation amount of the deformation mechanism is defined as a deformation amount estimated on the basis of a detected floor reaction force value. Then, a free leg foot position/posture relative to the supporting leg in the entire figure (the leg 2 at the rear side of the robot 1 shown in FIG. 12) is determined, and the determined position/posture may be used as the estimated free leg foot position/posture at landing. Alternatively, a disturbance observer may be used on the basis of a motor current command or a detected value to estimate a load acting on a decelerator or a link, and deformation of the decelerator or the link may be estimated on the basis of the estimated load so as to determine an estimated free leg foot position/posture at landing, including (considering) the deformation of the decelerator or the link.

Further alternatively, an estimated free leg foot position/posture at landing may be determined by kinematics computation on the basis of at least a joint displacement of a desired gait (a desired joint displacement value) and a compliance compensation amount (refer to Japanese Unexamined Patent Application Publication No. 10-277969 previously proposed by the present applicant).

The above arrangements make it possible to determine estimated free leg foot positions/postures at landing with still higher accuracy.

When walking the robot 1, the processing in S2214 may use the same technique for determining estimated free leg foot positions/postures at landing to determine the body position relative to a supporting leg coordinate system by kinematics computation on the basis of current detected joint displacement values of individual joints of the robot 1, and then determine an estimated body position such that the positional relationship of the estimated body position relative to a current estimated supporting leg coordinate system agrees with the above determined positional relationship. In this case, the relationship among estimated body positions, estimated supporting leg coordinate systems, and detected joint displacement values is as shown in FIG. 12.

Alternatively, a body position relative to a supporting leg coordinate system may be determined by kinematics computation on the basis of at least a joint displacement of a desired gait (a desired joint displacement value) and a compliance compensation amount (refer to Japanese Unexamined Patent Application Publication No. 10-277969 previously proposed by the present applicant), and then the relationship of an estimated body position with respect to an estimated supporting leg coordinate system may be set to agree with the above determined body position.

The above arrangements make it possible to determine estimated body positions with still higher accuracy.

Processing of S2200 and processing of S2216 will now be explained in detail with reference to FIG. 13. In the following explanation, an estimated body position determined in S2214 will be referred to as a geometrically estimated body position.

To explain the processing of S2200 in detail, based on a motion at the geometrically estimated body position determined as described above in a preceding control cycle or earlier, a geometrically estimated body acceleration, which is a second-order differential of the geometrically estimated body position, is calculated. This processing is carried out by a block 301 shown in FIG. 13. It is assumed that the processing for determining the geometrically estimated body position is carried out by a block 300 shown in FIG. 13. Complementarily, as long as the positions of a body representative point and the accelerometer coincide with each other, an estimated body posture is not necessary in calculating a geometrically estimated body acceleration (strictly speaking, the acceleration at the position of the accelerometer in the body 3 that is geometrically estimated).

Subsequently, an accelerometer detected value converted to a global coordinate system value obtained by converting a detected value of the accelerometer (a detected acceleration value of the body) into a global coordinate system by using an estimated body posture is determined. This processing is carried out by a block 302 shown in FIG. 13. To simplify the explanation, it is assumed here that the position of the accelerometer and the position of the body representative point coincide with each other. If they do not coincide, then the kinematics computation may be used to convert a detected value of the accelerometer and a detected value of the gyro sensor into an acceleration and an angular velocity at the body representative point, or to convert the acceleration and the angular velocity at the body representative point into an acceleration at a position of the accelerometer and an angular velocity at a position of the gyro sensor.

Figure 13:
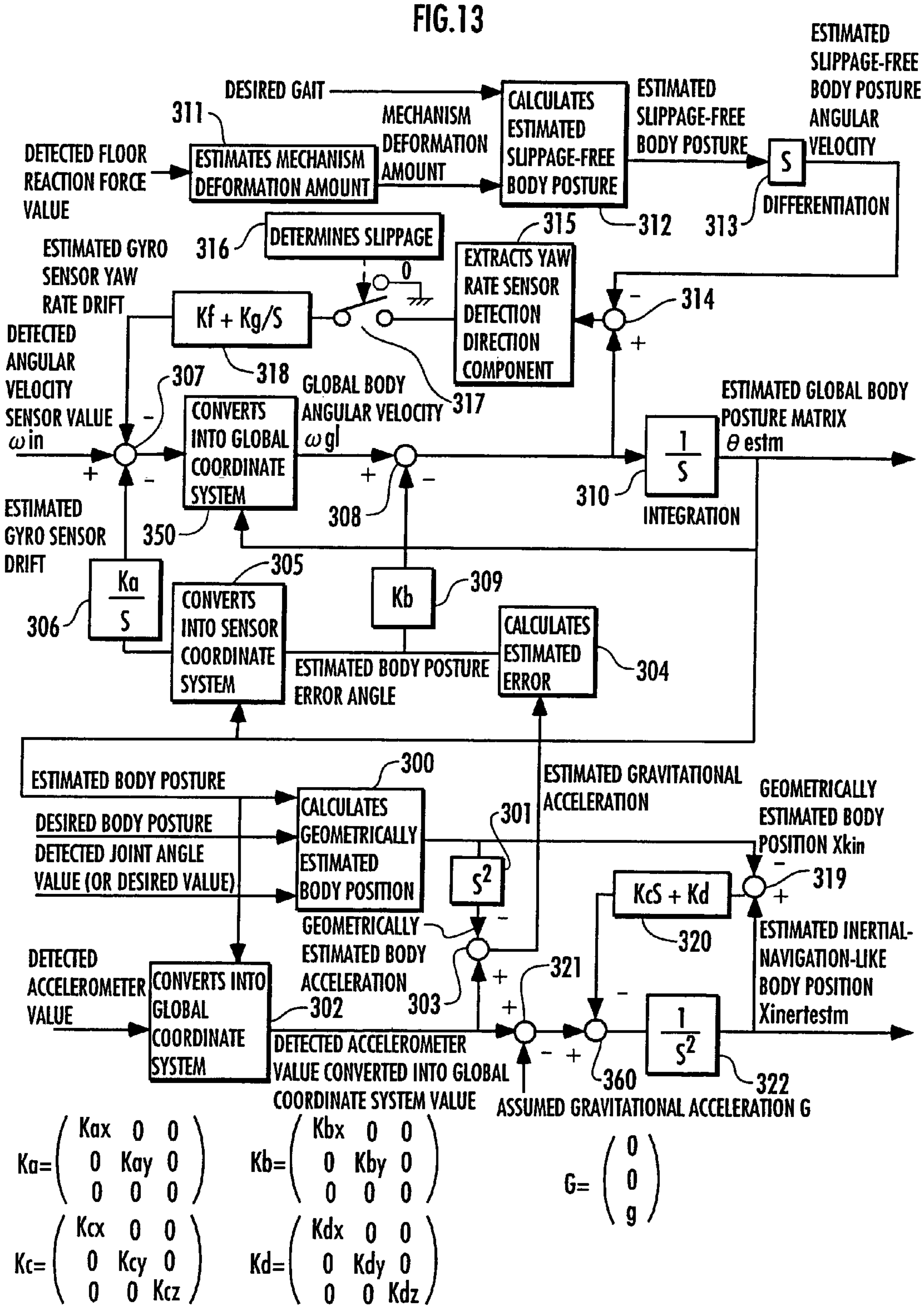
FIG. 13 is a block diagram showing a processing of an essential section of the processing for estimating the self position/posture in the flowchart of FIG. 9.
Figure 14:
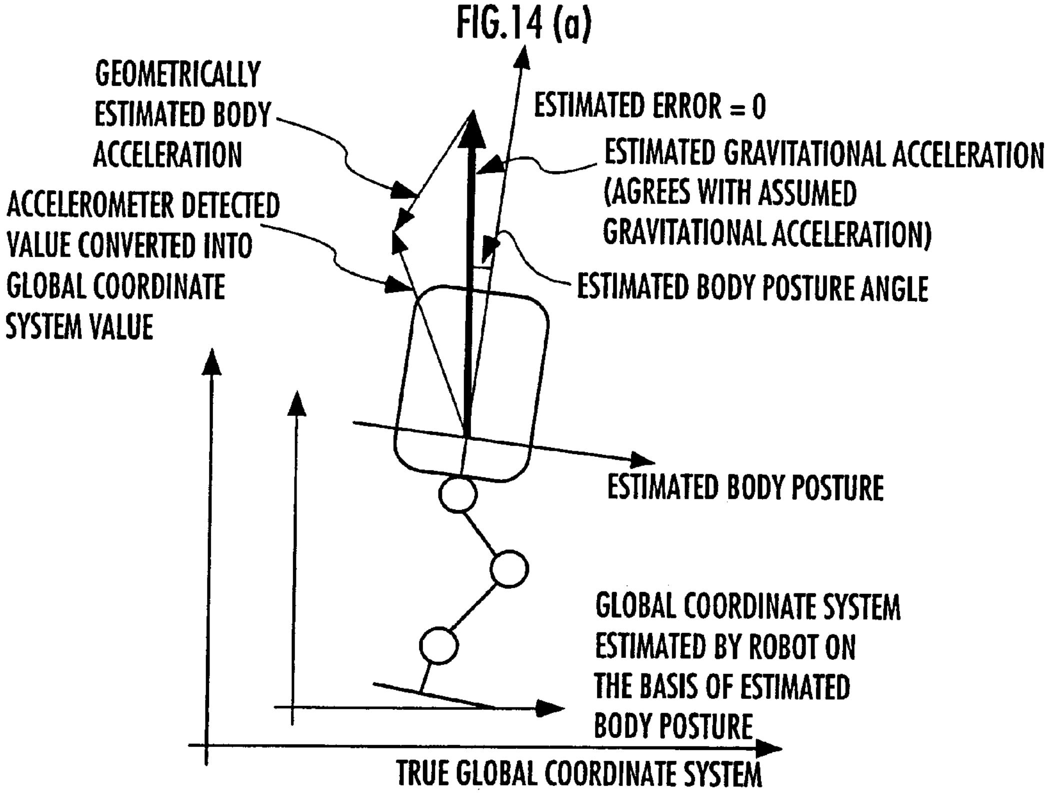
FIGS. 14(*a*) and (*b*) are diagrams for explaining the processing illustrated in FIG. 13.
Figure 14:
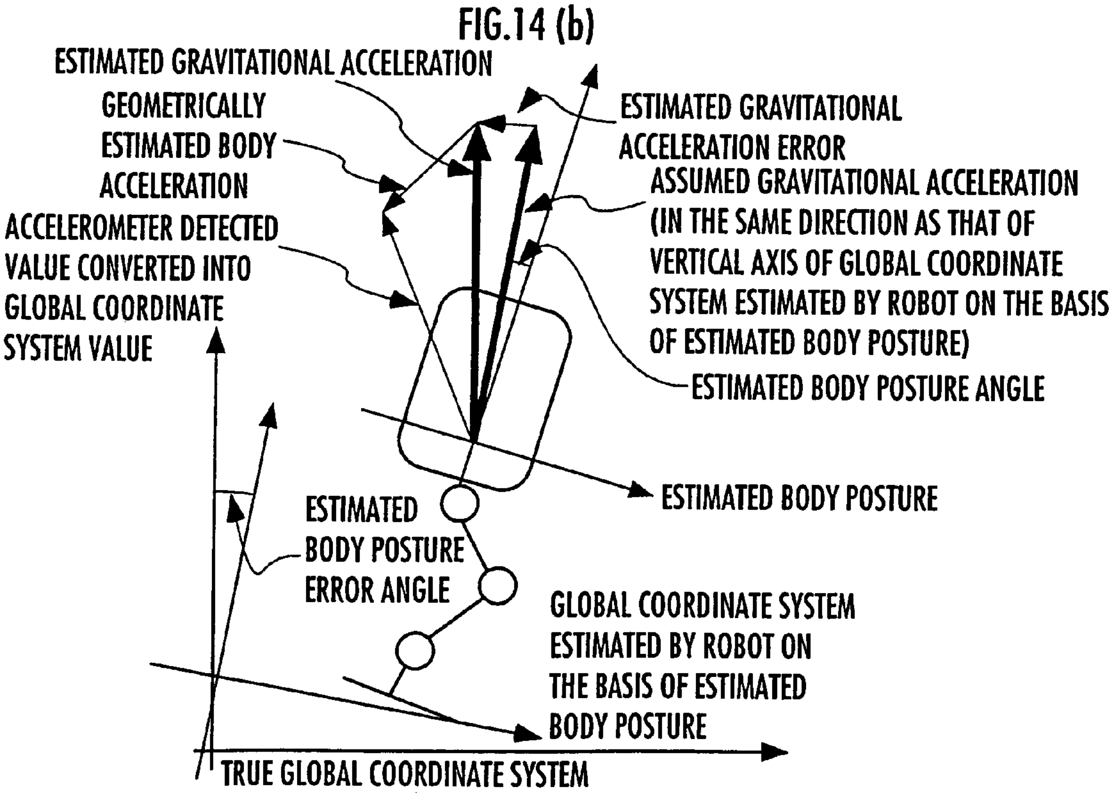

Then, as illustrated in FIG. 14(*a*) and FIG. 14(*b*), the geometrically estimated body acceleration is subtracted from a value obtained by converting a detected value of the accelerometer into a global coordinate system value (vector subtraction) so as to determine an estimated gravitational acceleration. The value obtained by converting a detected value of accelerometer into a global coordinate system value includes an acceleration component from gravity acting on the accelerometer, while the geometrically estimated body acceleration does not include any acceleration component from gravity. Thus, an estimated gravitational acceleration is determined by subtracting the geometrically estimated body acceleration from the value obtained by converting an accelerometer detected value into a global coordinate system value. This processing is implemented by a block 303 shown in FIG. 13. FIG. 14(*a*) illustrates a case where the estimated body posture has no error, while FIG. 14(*b*) illustrates a case where the estimated body posture has an error (hereinafter referred to as an estimated body posture error or an estimated body posture angular error).

Meanwhile, gravitational acceleration assumed to be generated in the vertical direction (Z-axis direction) of a global coordinate system estimated by the robot 1 on the basis of an estimated body posture, as shown in FIG. 14(*a*) and FIG. 14(*b*), is referred to as an assumed gravitational acceleration.

As previously mentioned, geometrically estimated body acceleration is described using a global coordinate system. The actual robot 1 is in motion, following a desired gait on the assumption that an estimated body posture correctly estimates an actual body posture. In other words, the robot 1 is in motion, following the desired gait, on the estimated global coordinate system on the assumption that the global coordinate system estimated on the basis of an estimated body position/posture is correct. More strictly speaking, in the self position/posture estimation processing of the robot 1, it is believed that a global coordinate system estimated on the basis of an estimated body position/posture is correct, and a behavior of the actual robot 1 is considered as a result of rotating the robot 1 in motion according to a desired gait on an estimated supporting leg coordinate system, which is a local coordinate system set on a global coordinate system believed to be correct, about a predetermined posture rotational center at a moment determined by a posture rotational center determining means by a variation in a posture rotational error as the difference between a changing speed of a body posture obtained (detected or estimated) by a posture detecting means at each moment and a body posture changing speed of a desired gait, the robot 1 rotating together with the estimated supporting leg coordinate system.

Accordingly, if an estimated body posture is correct and a detected value of the accelerometer is free of an error, then the assumed gravitational acceleration and the estimated gravitational acceleration agree with each other, as shown in FIG. 14(*a*).

Meanwhile, even if a detected value of the accelerometer includes no error, if an estimated body posture includes an error, then an estimated body posture angular error is produced between the direction of the assumed gravitational acceleration and the direction of the estimated gravitational acceleration, as shown in FIG. 14(*b*). Thus, expression 42 holds true.

Estimated body posture angular error=Angle formed by assumed gravitational acceleration and estimated gravitational acceleration   Expression 42

As shown in FIG. 14(*a*) and FIG. 14(*b*), it can be understood that, if the difference between an estimated gravitational acceleration and an assumed gravitational acceleration is referred to as an estimated gravitational acceleration error, then the estimated gravitational acceleration error is generated by an error in an estimated body posture provided a detected value of the accelerometer has no error, and the relationship represented by expression 43 exists between a horizontal component of the estimated gravitational acceleration error observed from the global coordinate system estimated by the robot 1 on the basis of an estimated body posture (a component orthogonal to an assumed gravitational acceleration of an estimated gravitational acceleration) and the estimated body posture angular error. Expression 43, however, indicates a relationship between a longitudinal component (X component) of an estimated gravitational acceleration error and a Y-axis component of an estimated body posture angular error. In a case where a relationship between a lateral component (Y component) of an estimated gravitational acceleration error and an X-axis component of an estimated body posture angular error is indicated, the minus sign on the right side may be deleted. Here, the gravitational acceleration is positive.

Horizontal component of estimated gravitational acceleration error=−tan (Estimated body posture angular error)*Gravitational acceleration   Expression 43

In the present embodiment, an estimated body posture is corrected using an estimated body posture angular error calculated from expression 42 or expression 43 so that an estimated body posture error converges to zero.

Returning to the explanation of the processing of S2200, an estimated body posture angular error is calculated, using expression 42, from the angle formed by the assumed gravitational acceleration and the estimated gravitational acceleration at the current instant (strictly speaking, at the instant of one control cycle before). Alternatively, expression 43 may be used to calculate the estimated body posture angular error from a horizontal component of an estimated gravitational acceleration error at the current instant (strictly speaking, at the instant of one control cycle before). The processing for calculating an estimated body posture angular error is carried out by a block 304 shown in FIG. 13.

Subsequently, the estimated body posture angular error is converted to a sensor coordinate system (a coordinate system having its coordinate axes matched to detection axes of the gyro sensor) by a block 305 shown in FIG. 13, and then a value obtained by multiplying the converted value by an integration gain Ka is integrated to determine an estimated gyro sensor drift (an estimated value of the drift of the gyro sensor). Furthermore, the estimated gyro sensor drift is subtracted from a gyro sensor detected value win (detected body angular velocity value) by a block 307 so as to determine an angular velocity with a corrected drift. In the block 307, a drift of a yaw rate is also subtracted, as necessary, which will be discussed hereinafter. Then, the angular velocity with the corrected drift is converted to a global coordinate system by a block 350, using an estimated body posture, so as to determine a global body angular velocity ωgl.

Next, a value obtained by multiplying the estimated body posture angular error by a gain Kb by a block 309 shown in FIG. 13 is subtracted from the global body angular velocity, and then the value resulting from the subtraction is integrated by a block 310 (integrator) to determine a new estimated body posture θestm.

The estimated body posture θestm and angular velocity or the like are represented by quarternion, rotational matrix or Euler angle or the like.

To ensure effective estimation when estimating a drift of the gyro sensor (estimated gyro sensor drift) by the construction described above, it is a precondition that each factor (each factor's estimated body posture angular error about a sensor detection axis, i.e., sensor local estimated body posture angular error) of a conversion value (vector) obtained by converting an estimated body posture angular error to a sensor coordinate system is subjected only to an influence of a drift of a gyro sensor associated with that factor and is not or hardly subjected to influences of drifts of other gyro sensors.

In other words, it is a precondition in that an error of a component about the X(Y)-axis of an estimated body posture angular error is subjected to an influence of a drift of a gyro sensor for the X(Y)-axis, but not subjected to an influence of a drift of a gyro sensor for the Y(X)-axis.

If the body is suddenly rotated 90 degrees about the Z-axis of a sensor coordinate system after a component about the X-axis of an estimated body posture angular error is generated due to an influence of a drift of the gyro sensor for the X-axis, then a component about a sensor local X-axis of the estimated body posture angular error is consequently shifted to a component about a sensor local Y-axis of the estimated body posture angular error, because the estimated body posture angular error remains accumulated in a global coordinate system. Hence, for the aforesaid precondition to hold true, it is a prerequisite that an absolute value of a speed of rotation about the Z-axis of a sensor coordinate system be sufficiently small.

Accordingly, if an absolute value of a detected value of a gyro sensor for the Z-axis (the vertical axis of the body) is large, then it is preferable to reduce the integration gain Ka or set it to zero (that is, to make no drift correction of the gyro sensor).

Normally, when the robot 1 moves or works, the vertical axis (trunk axis) of the body 3 is vertical or close to vertical. Hence, the global body angular velocity ωglz obtained by converting a detected angular velocity value of a gyro sensor into a global coordinate system takes a value close to a detected angular velocity value of the gyro sensor for the Z-axis.

Figure 15:
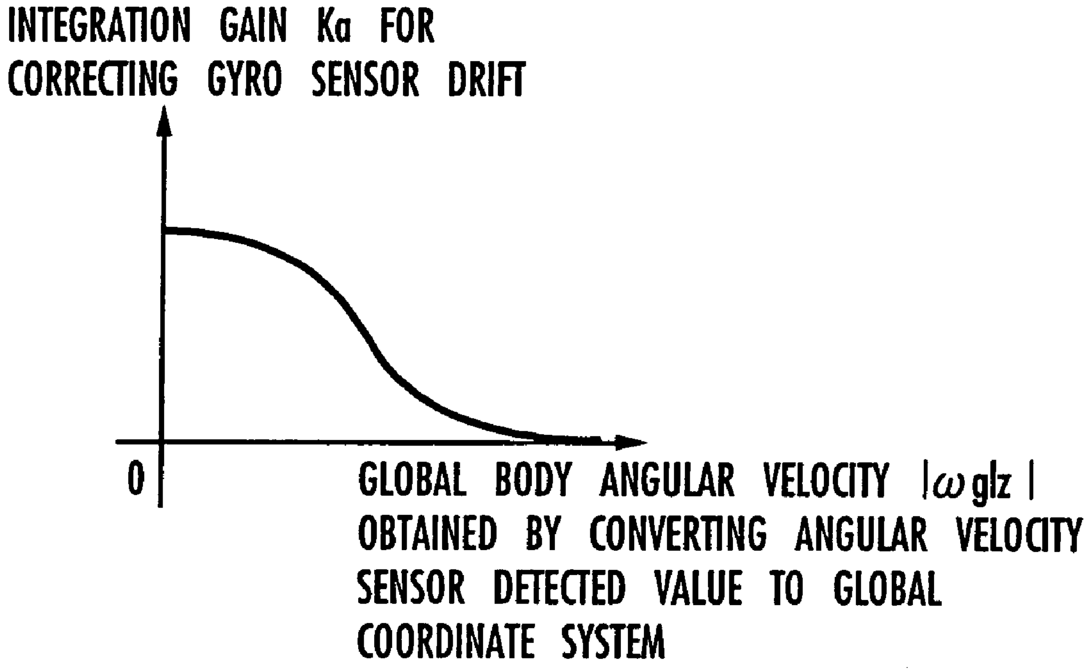
FIG. 15 is a graph showing a setting example of a gain used for the processing illustrated in FIG. 13.

Thus, as shown in FIG. 15, if an absolute value of the angular velocity ωglz about a vertical axis of a global body angular velocity obtained by converting a detected angular velocity value of a gyro sensor into a global coordinate system is large, then the integration gain Ka may be set to a small value or zero (i.e., no drift correction of the gyro sensor may be made).

Instead of an angular velocity detected value of a gyro sensor, if an absolute value of a component about the vertical axis of a body rotational speed of a desired gait of the body 3 or a component about the vertical axis of the body 3 is large, then the integration gain Ka may be set to a small value or zero (i.e., no drift correction of the gyro sensor may be made).

In summary, if an absolute value of a component about the vertical axis of the body rotational speed or a component about the vertical axis of the body 3 that is determined on the basis of at least either a detected angular velocity value of a gyro sensor or a desired gait is large, then the integration gain Ka should be set to a small value or zero (meaning that no drift correction of the gyro sensor should be made).

If an absolute value of a value obtained by subtracting an assumed gravitational acceleration from a detected value of the accelerometer converted into a global coordinate system value or an absolute value of a geometrically estimated body acceleration is large, then an error of the estimated gravitational acceleration tends to increase due to a detection error of a sensor or insufficient rigidity of the main body of the robot 1. Therefore, the aforementioned gain Ka should be set to be a small value or zero.

As described above, the actual robot 1 assumes that the global coordinate system estimated on the basis of an estimated body position/posture is correct and moves to follow a desired gait on the estimated global coordinate system. Hence, in a state wherein a supporting leg is in contact with the ground, even if an estimated body posture includes a large error, an actual body acceleration will not be governed by an actual gravitational acceleration, so that it substantially coincides with a geometrically estimated body acceleration on the estimated global coordinate system. On the other hand, in a floating period, an actual body acceleration is accelerated by being governed by an actual gravitational acceleration, resulting in a considerable shift from a direction of the geometrically estimated body acceleration on the estimated global coordinate system. Hence, the relationship shown in FIG. 14(*b*) no longer applies. Thus, in the floating period, the accuracy of a geometrically estimated body position tends to be lower than the accuracy of a body position determined by the inertial navigation on the basis of an accelerometer and a gyro sensor with relatively high accuracy. Hence, the gain Ka should be set to a small value or zero also in the floating period.

If a body position is estimated, taking the deformation of the foot 22 into account, as mentioned above, an estimation error in a deformation amount in the vicinity of a sole tends to increase in a state wherein the foot 22 at the distal end of a leg is in poor contact with a floor even in a non-floating period, leading to deteriorated accuracy of a geometrically estimated body acceleration. For this reason, the gain Ka should be set to a small value or zero also when the area of contact between the foot 22 of a supporting leg and a floor is small.

The state wherein the foot 22 of a leg 2 is in good contact with a floor specifically refers to a state wherein at least one of the following conditions is satisfied or a plurality of the following conditions is simultaneously satisfied.

a) State wherein the area of contact between the bottom surface of the foot 22 and a floor is large, e.g., the foot 22 is in full contact with the floor (a state of so-called flatfoot).

b) State wherein distributed pressure of a floor reaction force is relatively even.

c) State wherein there are many ground contact locations.

d) State wherein a desired ZMP (or an actual floor reaction force central point) is located at the center or near the center of the foot 22.

e) State wherein a ground contact pressure or a floor reaction force is high.

f) State wherein a position/posture rate of change of the foot 22 is small, or strictly speaking, a change in a relative position/posture relationship between the bottom surface of the foot 22 and a floor is small.

The above states may be determined on the basis of, for example, a timing (phase) of a desired gait, a desired ZMP, or a detected floor reaction force value. Alternatively, the above states may be determined on the basis of detected values of a distributed pressure sensor or a contact sensor, which is not provided in the present embodiment.

To summarize the gain setting method described above, it is desirable to set the gain Ka to a small value or zero in a state wherein an absolute value of a component about the vertical axis of a body rotational speed or a component about the axis in the vertical direction of the body 3 that is determined on the basis of at least either a detected angular velocity value of a gyro sensor or a desired gait of is large, a state wherein an absolute value of a value obtained by subtracting an assumed gravitational acceleration from a detected accelerometer value converted into a global coordinate system or an absolute value of a geometrically estimated body acceleration is large, or in a floating period, or in a state wherein a distal end portion (foot) of a leg is not in good contact with a floor.

In other words, the integration gain Ka should be determined by making comprehensive judgment based on the aforesaid states.

The integration gain Ka may alternatively be determined on the basis of instantaneous values of the aforesaid states or a long-term trend.

For the same reason, an integration gain Kb is preferably set in the same manner as that for the gain Ka.

In S2200 of the present embodiment, in addition to the aforesaid processing, a yaw rate correction (a drift correction in the yaw direction) is also made as described below, depending on situations. This correction processing is the processing related to the characteristics of the present invention.

First, whether to correct a yaw rate is determined by a block 316 shown in FIG. 13.

To be more specific, at least one or a plurality of the following conditions is prepared as determination conditions, and it is determined to correct a yaw rate if the determination condition or conditions are satisfied.

a) An absolute value of a detected floor reaction force moment (or its differential value) about the vertical axis is a predetermined value or less.

b) A desired operation is substantially static.

c) Contact between a sole and a floor is considered to be good with no slippage.

d) An absolute value of a difference between a posture angular velocity of a desired gait and a detected gyro value (a detected posture angular velocity value) is a predetermined value or less.

e) An absolute value of a posture angular velocity of a desired gait is a predetermined value or less.

f) An absolute value of a detected gyro value (a detected posture angular velocity value) is a predetermined value or less.

Basically, it will be determined to make a yaw rate correction in a situation wherein no slippage (rotational slippage) takes place or it is difficult for slippage to take place on a ground contact surface between the supporting leg foot 22 and a floor.

The detected gyro values in d) and f) are desirably the values obtained by directly subjecting detected values of the gyro sensor (detected posture angular velocity values represented by raw outputs themselves of the gyro sensor) to yaw rate correction.

Then, when it is determined to perform the yaw rate correction, as shown in FIG. 13, a deformation amount of the deformation mechanism of the foot 22 (the elastic member 106, the ground contact member (sole elastic member) 71, the bag-shaped member 109, etc. shown in FIG. 3 and FIG. 4) is determined, by a block 311, using a dynamic model (a spring damper model or the like) of the deformation mechanism on the basis of a detected floor reaction force value by the six-axis force sensor 50 (the floor reaction force sensor). Then, based on the determined deformation amount (the mechanism deformation amount) and a desired gait (a desired motion), a block 312 calculates a body posture when it is assumed that no slippage is taking place between the foot 22 and a floor (hereinafter referred to as an estimated body posture with no slippage) corresponding to an estimated supporting leg coordinate system (the latest estimated supporting leg coordinate system determined in S2212 shown in FIG. 10) stored at the latest landing (landing instant) of the robot 1. In other words, the current estimated body posture without slippage is determined based on the desired gait (desired motion), taking the mechanism deformation amount into account, on the assumption that no posture rotation (a change in the posture rotation error) has occurred after the latest landing instant (on the assumption that the position/posture of the estimated supporting leg coordinate system has not changed after the landing instant). In place of the desired gait (desired motion), a detected joint displacement value or a desired displacement value of the robot 1 may be used to determine the estimated body posture without slippage. Alternatively, a disturbance observer may be used on the basis of a motor current command or a detected value to estimate a load acting on a decelerator or a link, and deformation of the decelerator or the link may be estimated on the basis of the estimated load so as to determine an estimated body posture with no slippage, including (considering) the deformation of the decelerator or the link. Further alternatively, an estimated body posture with no slippage may be determined by kinematics computation on the basis of at least a joint displacement of a desired gait and a compliance compensation amount (refer to Japanese Unexamined Patent Application Publication No. 10-277969 previously proposed by the present applicant). The above arrangements make it possible to determine estimated slippage-free body postures with further improved accuracy.

Then, a block 313 determines an estimated body posture angular velocity without slippage, which provides a differential value of the estimated body posture without slippage, by using a current value of the estimated body posture without slippage determined as described above and a value of a previous control cycle (previous or earlier control cycle). Furthermore, a block 314 determines a difference between an input to a block (integrator) 310 that outputs the estimated body posture, i.e., a body posture angular velocity output from the block 308, and the aforesaid estimated body posture angular velocity without slippage. Of the difference, a component in a detection direction (hereinafter referred to as "angular velocity error component in detection direction of a yaw rate sensor") of a yaw rate sensor (a gyro sensor for detecting yaw rates) is extracted by a block 315. An estimated body posture (the value determined in the preceding control cycle) is used to extract the angular velocity error component in a detection direction of the yaw rate sensor. In place of the estimated body posture, a body posture of a desired gait may be used. If the body posture is vertical or nearly vertical, then a value of a vertical component of the aforesaid error (an output of the block 314) may be used as the angular velocity error component in a detection direction of the yaw rate sensor.

Subsequently, the angular velocity error component in a detection direction of the yaw rate sensor is supplied to a block 318 of a feedback control law so as to determine (estimate) a yaw rate drift. As the feedback control law of the block 318, PI control law, for example, is used. The sum of a value obtained by multiplying the angular velocity error component in a detection direction of the yaw rate sensor (the output of the block 315) by a gain Kf and a value obtained by multiplying an integrated value of the angular velocity error component in a detection direction of the yaw rate sensor by a gain Kg is determined so as to determine a yaw rate drift. Then, the determined yaw rate drift is subtracted from the aforesaid detected angular velocity sensor value ωin by the block 307. If it is determined not to perform the yaw rate correction, then input of the feedback control law to the block 318 is shut off (a switch 317 in FIG. 13 is disconnected from an output side of the block 315 and closed to "0" input side), an immediately preceding yaw rate drift value is retained, and the value is subtracted from the detected angular velocity sensor detected value ωin.

The above has provided detailed explanation of the processing of yaw rate correction in S2200 of FIG. 10.

Referring now to FIG. 13, processing of S2216 of FIG. 10 will be explained in detail. In the processing of S2216, a difference between a previous value of an inertial-navigation-like estimated body position Xinertestm and the aforesaid geometrically estimated body position is determined by a block 319, and a sum of a value obtained by multiplying a temporal differential value of the above difference (or a variation in the difference between control cycles) by a gain Kc and a value obtained by multiplying the difference by a gain Kd is determined by a block 320, as shown in FIG. 13. In other words, the sum is determined from the difference by PD control law as the feedback control law. Furthermore, a difference between the detected accelerometer value converted into a global coordinate system value, which is an output of the block 302, and an assumed gravitational acceleration G is determined by a block 321. Then, a value obtained by subtracting the above sum (the output of the block 320) from the difference (the output of the block 321) is subjected to second-order integration by a block 322 so as to determine a new inertial-navigation-like estimated body position Xinertestm.

The gains Kc and Kd should be set to a small value or zero in a situation where a large error in a geometrically estimated body position tends to be produced. A smaller area of contact between the bottom surface of the foot 22 of a supporting leg and a floor results in a large error in a geometrically estimated body position. If, therefore, the area of contact between the bottom surface of the foot 22 of a supporting leg and a floor is small, then the gains Kc and Kd should be set to a small value or zero. Especially when the foot 22 is fully in contact with a floor (the "flat-footed"), the gains Kc and Kd should be set to larger values.

Thus, in a running mode, for example, correction gains Ka, Kb, Kc and Kd may be set to large values while the full sole surface is in contact with the ground and set to zero or substantially zero in the floating period, as indicated by the graph of a correction gain K shown in FIG. 8(*c*). Although the graph of the correction gain K in FIG. 8(*c*) indicates a trend of change in magnitude of Ka, Kb, Kc and Kd, the graph does not show precise values. In FIG. 8(*c*), the correction gains have been standardized such that the maximum value of the correction gain K is 1. Hence, K may be considered to mean a restrictor (damper) of the correction gains Ka, Kb, Kc and Kd.

In the present embodiment, an estimated body posture has been corrected on the basis of an estimated body posture error calculated according to expression 42 or expression 43 shown above. Alternatively, however, an estimated body posture may be directly corrected on the basis of a horizontal component of an estimated gravitational acceleration error without using expression 42 and expression 43. In other words, expression 44 given below may be used in place of expression 43.

Horizontal component of estimated gravitational acceleration error=−Estimated body posture error angle*Gravitational acceleration  Expression 44

To add more explanation of the setting of the gain Ka, in the floating period, whatever value an estimated body posture error takes, the entire robot 1 behaves as if it were in a weightless state, as observed from a coordinate system in a parabolic motion together with the robot 1, so that outputs of the accelerometer are not influenced by errors in estimated body postures. For this reason, an estimated gravitational acceleration and an assumed gravitational acceleration always substantially agree with each other if a condition (hereinafter referred to as "condition A") in which detection accuracy of the accelerometer is high, the actual robot 1 exhibits high performance of following a desired gait, rigidity of the robot 1 is high, and parameters of a robot dynamic model used for generating desired gaits substantially agree with those of the actual robot 1 is satisfied. Strictly speaking, an estimated gravitational acceleration and an assumed gravitational acceleration deviate from true values by the same amount according to an estimated body posture error. As a result, estimated gravitational accelerations and assumed gravitational accelerations always substantially agree with each other. Essentially, therefore, it is impossible to estimate any gravitational directions in a floating period. However, since estimated gravitational accelerations and assumed gravitational accelerations always substantially agree with each other, the estimated body posture error at that moment is substantially zero. Hence, even if the gain Ka is not set to a small value, a correction amount determined by multiplying an estimated body posture error by the gain Ka will be also substantially zero, being less likely to exert considerably adverse influences on estimated body postures.

If the aforesaid condition A is satisfied, the accuracy of a low-frequency component (DC component) of an estimated body posture rather increases in some cases by holding the gain Ka constant. This is because, as described above, according to a construction adapted to make a correction so as to reduce a value obtained by integrating a value multiplied by the gain Ka to zero, the gain Ka held at a constant value theoretically works to set a long-time mean value of a horizontal component of an estimated gravitational acceleration error to zero, and if an estimated body posture error is zero, then the long-time mean value of the horizontal component of an estimated gravitational acceleration error is theoretically zero. Normally, however, it is difficult to satisfy the condition A, so that the gain Ka is desirably set as shown in FIG. 8(*c*).

As an alternative, the value of the correction gain Ka, Kb, Kc or Kd may be determined using a stationary Kalman filter technique or a nonstationary Kalman filter technique. However, in the robot 1 according to the present embodiment, properties of system noises (disturbance) and observation noises do not fully satisfy prerequisites of the Kalman filters especially during travel, so that satisfactory effect is not necessarily produced.

The following is a complementary explanation of the posture rotational center determined in the present embodiment. During a period in which one of the legs 2 is in contact with the ground and a sufficiently large floor reaction force is being generated, a posture rotational center is considered to lie in a so-called supporting polygon (a smallest convex polygon including a ground contact surface, a range allowing ZMP to be therein, or a range allowing a total floor reaction force central point to be therein).

The following describes a reason for the above. If a posture rotational center lies outside a supporting polygon, then every point on the bottom surface of the foot 22 will be relatively moving with respect to a floor, so that kinetic friction acts on every point of contact between the bottom surface of the foot 22 and the floor. The kinetic friction remains at a constant value even when the robot 1 moves the leg 2 to control a floor reaction force, and therefore cannot be controlled to an arbitrary value. This is identical to a state in which the robot 1 can hardly walk on slippery ice. Therefore, if the robot 1 is stably moving while controlling floor reaction forces, then it is considered that static friction is acting in a certain region between the bottom surface of the foot 22 and the floor, preventing slippage. In other words, a posture rotational center is considered to lie in a supporting polygon. Complementarily, if the foot 22 of the robot 1 is completely rigid, then slippage would take place at every contact point other than the posture rotational central point. However, the bottom surface of the actual foot 22 is formed of an elastic member, such as rubber, so that it is considered that slippage does not occur even in the vicinity of the posture rotational center.

In the floating period, the robot is considered to perform perturbational motion about the center of gravity.

In a period other than the above, namely, in a period in which one of the legs 2 is in contact with the ground although a sufficient floor reaction force has not yet been produced, the posture rotational center is considered to exist between a supporting polygon and the position of a total center of gravity (or a position of a representative point of the body) when motional continuity is taken into account.

Based on the above consideration, more generally, the posture rotational center to be determined in S2204 of FIG. 10 described above is preferably one of the following.

At current time t;

a) Desired ZMP, b) Actual ZMP (specifically, an actual floor reaction force central point or a pressure central point of floor reaction force), c) Predetermined point, e.g., origin, of a supporting leg coordinate system, d) Total center of gravity, e) Representative point of the body f) Internally dividing point of a plurality of one of the above In a period wherein one leg is in contact with the ground and a sufficiently large floor reaction force has been generated, the posture rotational center should be set in a supporting polygon. To be more specific, the posture rotational center may be set to a) and b) shown above. Alternatively, a predetermined point mentioned in c) above may be set such that the posture rotational center is included in a supporting polygon. For instance, the posture rotational center may be set at the origin (normally the bottom of an ankle joint) of a supporting leg coordinate system.

In a floating period, the posture rotational center should be set according to d) above. The position of a total center of gravity is present near the position of a representative point of the body, so that it may be set according to e).

In a period other than those described above, namely, during a period wherein one leg 2 is in contact with the ground, but a sufficiently floor reaction force has not yet been produced, setting should be made as per f).

Furthermore, considering the continuity of motion over all periods, the posture rotational central point is preferably set to exhibit a continuous change.

At any rate, at almost every moment, it is desirable to set posture rotational central points on a surface of or inside a smallest convexity that includes the entire robot 1.

In the embodiment explained above, the accelerometer and/or the gyro sensor is installed on the body 3; however, they may alternatively be mounted on (incorporated in) other part, such as the head 4. If there is a neck joint between the head 4 and the body 3, detected values of the accelerometer and/or the gyro sensor are converted into the accelerations and angular accelerations of a representative point of the body by kinematics computation on the basis of displacement commands (desired displacements) or detected displacement values of the neck joint, and the rest may be accomplished by estimating self positions, as in the above embodiments.

When joint displacements are used to determine estimated supporting leg coordinate systems and geometrically estimated body positions, the joint displacements were the joint displacements of desired gaits or detected joint displacement values; alternatively, however, the joint displacements may be weighted averages thereof. The weight for this purpose may be frequency characteristics.

Estimated positions/postures, such as estimated supporting leg coordinate systems and estimated body positions/postures, may be expressed in terms of perturbations from desired positions/postures instead of expressing them by using global coordinate systems as references, as in the aforesaid embodiment.

In the above embodiment, as shown in FIG. 13, an estimated body posture angular error in a global coordinate system has been determined on the basis of an estimated gravitational acceleration in a global coordinate system, and a value obtained by multiplying the estimated body posture angular error in the global coordinate system by the gain Kb has been additionally supplied to the integrator (the block 310 shown in FIG. 13) that integrates the global body angular velocity ωgl so as to correct the estimated body posture. In other words, estimated body postures have been corrected in global coordinate systems; however, they may alternatively be corrected on local coordinate systems (coordinate systems fixed to the body 3) of the gyro sensor. More specifically, in FIG. 13, the block 309 of the gain Kb and an adder (the block 308) that subtracts an output of the block 309 from the global body angular velocity ωgl may be deleted, and the integrator Ka/S (the block 306) may be replaced by Ka/S+Kb, namely, a block of PI control law.

In principle, Kb would not lead to poor convergence of an inclination drift in turning (including the turning on the spot) with a high yaw rate even if a correction is made using a local coordinate system, as described above.

To correct an estimated body posture, an estimated gravitational acceleration may be determined by subtracting a body acceleration of a desired gait from a detected accelerometer value converted into a global coordinate system value in place of determining the estimated gravitational acceleration by subtracting a geometrically estimated body acceleration from an detected accelerometer value converted into a global coordinate system value.

In an actual operation, when a robot is about to move according to a desired gait, a posture rotation about a posture rotational center has been generated, so that the posture rotation causes a body acceleration to deviate from the desired gait. However, a posture inclination in the posture rotation remains zero on the average even if longitudinal or lateral shakes occur. Furthermore, the direction of spin in posture rotation is reversed for each step, so that the spin is close to zero on the average. Therefore, except for those forces, such as a centrifugal force, that act substantially in the same direction regardless of the rotational direction of posture rotation, positive influences and negative influences on the body acceleration caused by posture rotations cancel each other. As a result, the influences will be substantially zero in the long term. The "long term" here refers to a period of time not less than the stabilization time of correction of an estimated body posture.

Thus, there will be no marked deterioration of correcting effect even if body accelerations of desired gaits are used, instead of geometrically estimated body accelerations, to correct estimated body postures.

As explained above, in the aforesaid embodiment, estimated body positions (estimated inertial-navigation-like body position) and estimated body postures are determined by inertial navigation, and the estimated inertial-navigation-like body positions and estimated body postures are corrected using geometrically estimated body positions. This makes it possible to accurately estimate self positions/postures, and landing positions and directions (positions and directions of estimated supporting leg coordinate systems) of the robot 1. Moreover, especially under a condition in which it is determined that no slippage is taking place between the foot 22 and a floor, e.g., while the robot 1 is at rest, the yaw rate correction is performed so that the self posture (body posture) of the robot 1 can be estimated with high accuracy.

INDUSTRIAL APPLICABILITY

As described above, the present invention is useful, providing a technology that makes it possible to accurately estimate a posture of a predetermined part, such as a body, of a leg type moving robot, e.g., a bipedal moving robot.

What is claimed is:

1. A system for estimating a self posture of a leg type moving robot being controlled to follow a determined desired gait, comprising:

a posture angular velocity detecting means for detecting a posture angular velocity of a predetermined part of the robot;

a slippage-free posture bony velocity estimating means for estimating a posture angular velocity of the predetermined part on the basis of motion state amounts of the robot, including at least one of a desired motion of the desired gait, a detected value of a displacement of a joint of the robot, and a desired value of a displacement of the joint, on the assumption that there is no slippage on a contact surface between the robot and a floor;

a drift correction value determining means for determining a drift correction value relative to a detected value of the posture angular velocity detecting means on the basis of at least a detected value of the posture angular velocity detecting means and a posture angular velocity estimated by the slippage-free posture angular velocity estimating means; and an integrating means for integrating at least the posture angular velocity obtained by correcting a detected value of the posture angular velocity detecting means by using the drift correction value, thereby to estimate a posture angle of the predetermined part, wherein the drift correction value determining means determines a new drift correction value so as to bring a difference between a posture angular velocity obtained by correcting a detected value of the posture angular velocity detecting means by using the drift correction value and a posture angular velocity estimated by the slippage-free posture angular velocity estimating means close to zero.

2. The system for estimating a self posture of the leg type moving robot according to claim 1, wherein the drift correction value determining means comprises a means for determining whether the rotational slippage is taking place on a contact surface between the robot and a floor, and a value of the drift correction value is retained if it is determined that the rotational slippage is taking place.

3. A system for estimating a self posture of a leg type moving robot, comprising:

a posture angular velocity detecting means for detecting a posture angular velocity of a predetermined part of a leg type moving robot;

a drift correction value determining means for determining, on the basis of at least a detected value of the posture angular velocity detecting means in a state wherein a motion of the robot is stopped, a drift correction value relative to the detected value; and an integrating means for integrating at least a posture angular velocity obtained by correcting a detected value of the posture angular velocity detecting means by the drift correction value while the robot is in motion so as to estimate a posture angle of the predetermined part.

4. The system for estimating a self posture of a leg type moving robot according to claim 1, wherein the drift correction value determining means determines the drift correction value on the basis of a component in a yaw direction of a detected value of the posture angular velocity detecting means and a component in the yaw direction of a posture angular velocity estimated by the slippage-free posture angular velocity estimating means.

5. The system for estimating a self posture of a leg type moving robot according to claim 3, wherein the drift correction value determining means determines the drift correction value on the basis of a component in the yaw direction of a detected value of the posture angular velocity detecting means.

6. The system for estimating a self posture of a leg type moving robot according to claim 1, wherein the predetermined part is a body of the robot.

7. The system for estimating a self posture of a leg type moving robot according to claim 3, wherein the predetermined part is a body of the robot.

* * * * *